US012556939B2

(12) United States Patent
Dey et al.

(10) Patent No.: US 12,556,939 B2
(45) Date of Patent: Feb. 17, 2026

(54) FIRST NODE, THIRD NODE, FOURTH NODE AND METHODS PERFORMED THEREBY, FOR HANDLING PARAMETERS TO CONFIGURE A NODE IN A COMMUNICATIONS NETWORK

(71) Applicant: Telefonaktiebolaget LM Ericsson (publ), Stockholm (SE)

(72) Inventors: Kaushik Dey, Kolkata (IN); Ashis Kumar Roy, Durgapur (IN); Dhiraj Nagaraja Hegde, Bengalore (IN); Abhishek Sarkar, Bengaluru (IN); Konstantinos Vandikas, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 436 days.

(21) Appl. No.: 18/015,154

(22) PCT Filed: Jul. 9, 2020

(86) PCT No.: PCT/SE2020/050720
§ 371 (c)(1),
(2) Date: Jan. 9, 2023

(87) PCT Pub. No.: WO2022/010390
PCT Pub. Date: Jan. 13, 2022

(65) Prior Publication Data
US 2023/0254709 A1 Aug. 10, 2023

(51) Int. Cl.
*H04W 24/06* (2009.01)
*G06N 3/08* (2023.01)
*H04W 24/02* (2009.01)

(52) U.S. Cl.
CPC .............. *H04W 24/02* (2013.01); *G06N 3/08* (2013.01)

(58) Field of Classification Search
CPC ...... G06N 3/045; G06N 3/0464; G06N 3/006; G06N 3/044; G06N 3/08; G06N 3/088;
(Continued)

(56) References Cited

U.S. PATENT DOCUMENTS 10,616,257 B1 * 4/2020 Soulhi ................. H04L 63/1425
2017/0070396 A1    3/2017 Flanagan et al.
(Continued)

FOREIGN PATENT DOCUMENTS

WO    WO-2019233635 A1 * 12/2019 ............. G06V 10/80

OTHER PUBLICATIONS

International Search Report and the Written Opinion of the International Searching Authority, issued in corresponding International Application No. PCT/SE2020/050720, dated May 5, 2021, 13 pages.

*Primary Examiner* — Quan M Hua
(74) *Attorney, Agent, or Firm* — Sonoda & Kobayashi Intellectual Property Law; Sarvaijt S. Patil

(57) ABSTRACT

A method, performed by a first node (111), for handling parameters to configure a second node (112). The first node (111) determines (207) parameters to configure the second node (112). The determining (207) is based on an analysis by a Generative Adversarial Network comprising performing iteratively: i) generating a set of parameters estimated to be linked to a performance of a first group of nodes (121) being above a threshold, and ii) discriminating between the generated set of parameters and a first set of parameters observed to be linked to the performance of the first group of nodes (121) being above the threshold to obtain a score for every parameter. The score indicates how different the generated parameters and the first set of parameters are. The determined parameters have the score resulting from the discriminating being lower than another threshold. The first
(Continued)

node (111) also outputs an indication comprising the determined parameters.

8 Claims, 7 Drawing Sheets

(58) Field of Classification Search
CPC ... G06N 7/01; H04L 43/0817; H04L 25/0254; H04L 25/03165; H04L 41/0895; H04W 24/02; H04W 84/18; H04W 24/10; H04W 24/08; H04W 48/16; H04W 16/24; H04W 24/04; H04W 24/06; H04W 36/00692
See application file for complete search history.

(56) References Cited

U.S. PATENT DOCUMENTS

| | | |
|---|---|---|
| 2019/0045370 A1 | 2/2019 | Al-Fanek et al. |
| 2019/0068443 A1 | 2/2019 | Li et al. |
| 2019/0141113 A1 | 5/2019 | Ganapathi et al. |
| 2019/0149425 A1* | 5/2019 | Larish ............... H04L 41/145 706/16 |
| 2019/0199743 A1 | 6/2019 | La Marca et al. |
| 2020/0213199 A1 | 7/2020 | Sethi et al. |
| 2020/0214017 A1* | 7/2020 | Krishnan ............ H04W 72/54 |
| 2021/0295167 A1* | 9/2021 | Hill ..................... G06V 10/82 |

\* cited by examiner a)

b)

a)

b)

a)

b)

US 12,556,939 B2

FIRST NODE, THIRD NODE, FOURTH NODE AND METHODS PERFORMED THEREBY, FOR HANDLING PARAMETERS TO CONFIGURE A NODE IN A COMMUNICATIONS NETWORK

CROSS REFERENCE TO RELATED APPLICATION(S)

This application is a 35 U.S.C. § 371 National Phase Entry Application of PCT/SE2020/050720, filed Jul. 9, 2020, designating the United States, the disclosure of which is incorporated herein by reference in its entirety.

TECHNICAL FIELD

The present disclosure relates generally to a first node and methods performed thereby for handling parameters to configure a second node in a communications network. The present disclosure also relates generally to a third node, and methods performed thereby for handling parameters to configure the second node in a communications network. The present disclosure further relates generally to a fourth node, and methods performed thereby for handling parameters to configure the second node in a communications network.

BACKGROUND

Computer systems may comprise one or more nodes. A node may comprise one or more processors which, together with computer program code may perform different functions and actions, a memory, a receiving port and a sending port. A node may be, for example, a server. Nodes may be comprised in a communications network.

Some types of nodes within a communications network may be wireless devices, e.g., stations (STAs), User Equipments (UEs), mobile terminals, wireless terminals, terminals, and/or Mobile Stations (MS). Wireless devices are enabled to communicate wirelessly in a cellular communications network or wireless communication network, sometimes also referred to as a cellular radio system, cellular system, or cellular network. The communication may be performed e.g. between two wireless devices, between a wireless device and a regular telephone, and/or between a wireless device and a server via a Radio Access Network (RAN), and possibly one or more core networks, comprised within the telecommunications network. Wireless devices may further be referred to as mobile telephones, cellular telephones, laptops, or tablets with wireless capability, just to mention some further examples. The wireless devices in the present context may be, for example, portable, pocket-storable, hand-held, computer-comprised, or vehicle-mounted mobile devices, enabled to communicate voice and/or data, via the RAN, with another entity, such as another terminal or a server.

The communications network may cover a geographical area which may be divided into cell areas, each cell area being served by another type of node, a network node or Transmission Point (TP), for example, an access node such as a Base Station (BS), e.g. a Radio Base Station (RBS), which sometimes may be referred to as e.g., evolved Node B ("eNB"), "eNodeB", "NodeB", "B node", or BTS (Base Transceiver Station), depending on the technology and terminology used. The base stations may be of different classes such as e.g. Wide Area Base Stations, Medium Range Base Stations, Local Area Base Stations and Home Base Stations, based on transmission power and thereby also cell size. A cell is the geographical area where radio coverage is provided by the base station at a base station site. One base station, situated on the base station site, may serve one or several cells. Further, each base station may support one or several communication technologies. Any of the cells may also be referred to as a node. Herein, a node may typically refer to one base station when managing one of its cells, in the event the base station manages more than one cell.

In 3rd Generation Partnership Project (3GPP) Long Term Evolution (LTE), base stations, which may be referred to as eNodeBs or even eNBs, may be directly connected to one or more core networks. All data transmission in LTE is controlled by the radio base station.

The standardization organization 3GPP is currently in the process of specifying a New Radio Interface called NR or 5G-UTRA, as well as a Fifth Generation (5G) Packet Core Network, which may be referred to as Next Generation Core Network, abbreviated as NG-CN, NGC, 5G CN or 5GC.

A 3GPP system comprising a 5G Access Network (AN), a 5G Core Network and a UE may be referred to as a 5G system.

During operation in a communications network, a performance of a node, e.g., a cell, may vary. It may be optimal, or it may degrade The performance of the node may be understood as a measure of an execution of a number of tasks. The performance of a node may be measured through one or more indicators, metrics or parameters. By comparing observed values of these parameters in the node with a respective threshold for each parameter, it may be possible to determine if the performance in the node is optimal, or degraded. Often, the performance of a node such as a cell working under various bandwidths, e.g., 700, 1900 and 2100 Hz, may be degraded due to heavy traffic, interference, coverage issues, weather factors and various other reasons. The performance degradation may be measured in terms of various call incidence parameters such as muting, garbling, soft drop, hard drops, access failure etc. Measurement of these parameters may be obtained from each node on a daily basis. The degradation of these incidence parameters in a consistent manner may be understood to indicate a bad performance of a node. For example, if a cell is ranked higher, then it is expected that the cell may experience lower percentages of muting, garbling, soft drop, hard drop, access failure incidences, whereas if a cell is ranked lower, then it may behave the other way around.

Poor performance of a node may result in waste of processing, energy, and time-frequency resources, leading in turn to an underperformance of the network and to a poor user experience.

SUMMARY

The degradation of node, e.g., cell, performance has a significant relation with the change of Configuration Management (CM) features of the node. Typically, in existing methods, and depending on the generation of the network, a degraded performance of a node may be addressed manually when an issue has occurred, that is, after the fact or post-mortem, or during roll-out, during installation of base stations, in an attempt to achieve correctness by design. Both approaches may be problematic because in the first approach, the issue has already occurred, namely, the degradation in performance, and in the second approach, properties that may have been available once the base stations were deployed, may no longer hold due to environmental issues, such as e.g., high temperature, or poor maintenance.

Therefore, both methods may still negatively affect the performance of a node in a communications network.

It is an object of embodiments herein to improve the handling of the performance of a node in a communications network. It is a particular object of embodiments herein to improve the handling of parameters to configure a node in a communications network.

Embodiments herein provide for methods that enable to fine-tune a deployment in a way to mitigate and even alleviate poor performance.

Embodiments herein describe an auto correction method to bring back bad performing nodes into their corrected state. Particular embodiments herein may describe an automated methodology to tune CM parameters remotely, so that their configuration may be best fitted with their changing traffic scenario.

As a step towards achieving an auto-correcting network, nodes that may need correction may be first identified. Then, embodiments herein may recommend suitable CM Parameter changes that may be needed in this node to achieve an improved performance. Hence, embodiments herein may be understood to address these two problems a) how to rank nodes based on performance, and b) what CM parameters may need to be changed in order to rectify a bad performing node.

Embodiments herein may rely on an auto-encoder methodology to rank the nodes based on their historical performance data. Based on daily ranking, the bad performing nodes with higher chances of needing correction in the configuration management parameters may be shortlisted because, often, node performance degrades due to the misconfiguration of these CM parameters while intending to adjust with the varying traffic throughout the day.

Further particularly, embodiments herein rely on unsupervised learning second-generation neural network-based technique auto-encoders to model the behavior of nodes. An auto-encoder may be understood as a Deep Neural Network (DNN) based approach to learn probability distributions of the node performances, and detecting deviation of daily node performances from their derived empirical distribution. In this approach, it is to be observed that those nodes which may be identified as deviating from normal behavior tend to have the best performance, or the worst, performances, since deviation may happen on both sides of normal behavior.

Alternative approaches such as using similarity or distance measures, e.g., an Euclidean distance measure, to identify configurations settings for a given traffic condition will not be able to identify CM settings for a given traffic condition very effectively because a distribution of the CM parameters for a given traffic setting is not learnt. That is, by using a similarity or distance measure, only the closest situation, e.g., traffic and incidents, similar to the current situation in the historical data may be determined, and CM parameters of the identified similar situation may be identified. However, the best for a current situation may not be determined. In addition, there is no obvious way to decide which similarity measure may need to be adopted.

According to a first aspect of embodiments herein, the object is achieved by a method performed by a first node. The method is for handling parameters to configure a second node. The first node operates in the communications network. The first node determines one or more parameters to configure the second node for operation to deliver a service in the communications network. The determining is based on an analysis performed by a Generative Adversarial Network (GAN). The GAN is managed by the first node. The analysis comprises performing iteratively: i) generating a set of parameters estimated to be linked to a performance of a first group of nodes operating in the communications network being above a first threshold; and ii) discriminating between the generated set of parameters and a first set of parameters observed to be linked to the performance of the first group of nodes being above the first threshold to obtain a respective score for every parameter. The respective score indicates how different the generated set of parameters and the first set of parameters are. The determined one or more parameters have the respective score resulting from the discriminating being lower than a second threshold. The first node also outputs an indication comprising the determined one or more parameters.

According to a second aspect of embodiments herein, the object is achieved by a method, performed by a third node. The method is for handling parameters to configure the second node. The third node is an auto-encoder operating in the communications network. The third node obtains the first set of parameters observed to be linked to the performance of the first group of nodes operating in the communications network being above the first threshold. The first set of parameters are parameters to configure the second node for operation to deliver a service in the communications network. The obtaining comprises the following i-iv. i) Training a first data model with respective data of nodes comprised in a group of nodes indicative or a respective performance of the nodes over a period of time. The group of nodes comprises the first group of nodes. ii) Obtaining a reconstruction of a respective error of the trained first data model for each of the nodes in the group of nodes. iii) Ranking the nodes comprised in the group of nodes based on their respective reconstructed error. iv) Selecting the first group of nodes from the group of nodes based on their respective reconstructed error being above the first threshold. The third node also provides, to the first node operating in the communications network, a first indication indicating the obtained first set of parameters.

According to a third aspect of embodiments herein, the object is achieved by a method, performed by a fourth node. The method is for handling parameters to configure the second node. The fourth node operates in the communications network. The fourth node obtains a fixed length vector encoding a plurality of traffic conditions observed to be linked to the performance of the first group of nodes operating in the communications network. The obtaining comprises: training a second data model with respective sequential traffic data of the nodes comprised in the first group of nodes to encode the respective sequential traffic data into the fixed length vector. The fourth node provides, to the first node operating in the communications network, a second indication indicating the obtained fixed length vector encoding the plurality of traffic conditions.

According to a fourth aspect of embodiments herein, the object is achieved by the first node for handling parameters to configure the second node. The first node is configured to operate in the communications network. The first node is further configured to determine the one or more parameters to configure the second node for operation to deliver a service in the communications network. To determine is configured to be based on the analysis configured to be performed by the GAN configured to be managed by the first node. The analysis is configured to comprise performing iteratively i-ii. i) Generating the set of parameters estimated to be linked to the performance of the first group of nodes configured to operate in the communications network being above the first threshold. ii) Discriminating between the set of parameters configured to be generated and the first set of parameters observed to be linked to the performance of the first group of nodes being above the first threshold to obtain the respective score for every parameter. The respective score is configured to indicate how different the generated set of parameters and the first set of parameters are. The one or more parameters configured to be determined are configured to have the respective score resulting from the discriminating lower than the second threshold. The first node is further configured to output the indication comprising the one or more parameters configured to be determined.

According to a fifth aspect of embodiments herein, the object is achieved by the third node for handling parameters to configure the second node. The third node is configured to be an auto-encoder being configured to operate in the communications network. The third node is further configured to obtain the first set of parameters configured to be observed to be linked to the performance of the first group of nodes configured to operate in the communications network being above the first threshold. The first set of parameters is configured to be parameters to configure the second node for operation to deliver a service in the communications network. To obtain is configured to comprise i-iv. i) Training the first data model with respective data of nodes configured to be comprised in the group of nodes indicative or the respective performance of the nodes over the period of time. The group of nodes is configured to comprise the first group of nodes. ii) Obtaining the reconstruction of the respective error of the first data model configured to be trained for each of the nodes in the group of nodes. iii) Ranking the nodes configured to be comprised in the group of nodes based on their respective reconstructed error. Additionally, iv) selecting the first group of nodes from the group of nodes based on their respective error configured to be reconstructed being above the first threshold. The third node is also configured to provide, to the first node configured to operate in the communications network, the first indication configured to indicate the first set of parameters configured to be obtained.

According to a sixth aspect of embodiments herein, the object is achieved by the fourth node for handling parameters to configure the second node. The fourth node is configured to operate in the communications network. The fourth node is further configured to obtain the fixed length vector encoding the plurality of traffic conditions configured to be observed to be linked to the performance of the first group of nodes configured to operate in the communications network. To obtain is configured to comprise: training the second data model with respective sequential traffic data of the nodes configured to be comprised in the first group of nodes to encode the respective sequential traffic data into the fixed length vector. The fourth node is configured to provide, to the first node configured to operate in the communications network, the second indication indicating the fixed length vector configured to be obtained encoding the plurality of traffic conditions.

By determining the one or more parameters to configure the second node, the first node is enabled to auto-correct the configuration of the second node with the determined one or more parameters, so that the performance of the second node, e.g., given similar conditions such as traffic, may be corrected to be as similar as possible to that observed in the first group of nodes, namely, the best performing nodes of the group of nodes.

By training the first data model with the respective data of the nodes comprised in the group of nodes, the third node may enable to predict, or eventually enable the first node to predict, for any given node, what the expected performance may be, that is the expected values of each of the incidents modeled, and therefore, detect any performance which may deviate from the expected performance, as explained next.

By obtaining the first set of parameters, the third node may be enabled to provide the first indication to the first node, thereby enabling the first node to use the first set of parameters as input to the GAN to determine the one or more parameters. By training the first data model with the respective data of the nodes comprised in the group of nodes, the third node may enable the first node to predict, for any given node, what the expected performance may be, that is the expected values of each of the incidents modeled, and therefore, detect any performance which may deviate from the expected performance. By obtaining the reconstruction of the respective error of the trained first data model for each of the nodes in the group of nodes, the third node may be enabled to determine which nodes in the group of nodes deviate from normal behavior. By ranking, or scoring, the nodes comprised in the group of nodes, based on their respective reconstructed error, the third node may be enabled to determine which nodes in the group of nodes deviate most from normal behavior. By selecting the first group of nodes from the group of nodes, the nodes comprised in the group of nodes having the best performance may be identified, which then enables that their parameter settings may be evaluated, so that the first set of parameters may be identified, and suitable configuration of parameters may be recommended to other nodes to optimize, improve or correct their performance in the communications network, given similar circumstances, e.g., similar traffic conditions.

By obtaining the fixed length vector, the fourth node may be enabled to provide the second indication, and in turn enable the first node to determine the one or more parameters to configure the second node for operation, and to do it based on different traffic conditions. In other words, the fourth node may enable the first node to determine which parameters may be most suitable to configure the second node with, given a certain traffic condition, in order to obtain a good performance.

BRIEF DESCRIPTION OF THE DRAWINGS

Examples of embodiments herein are described in more detail with reference to the accompanying drawings, according to the following description.

DETAILED DESCRIPTION

Several embodiments are comprised herein, which address the limitations of the existing methods. Embodiments herein may be understood to aim at improving the performance of a node, such as a cell, in a communications network. As an overview, embodiments herein may be understood to be related to methods to rank nodes and recommend CM parameter changes.

The embodiments will now be described more fully hereinafter with reference to the accompanying drawings, in which examples are shown. In this section, embodiments herein are illustrated by exemplary embodiments. It should be noted that these embodiments are not mutually exclusive. Components from one embodiment or example may be tacitly assumed to be present in another embodiment or example and it will be obvious to a person skilled in the art how those components may be used in the other exemplary embodiments.

Figure 1:
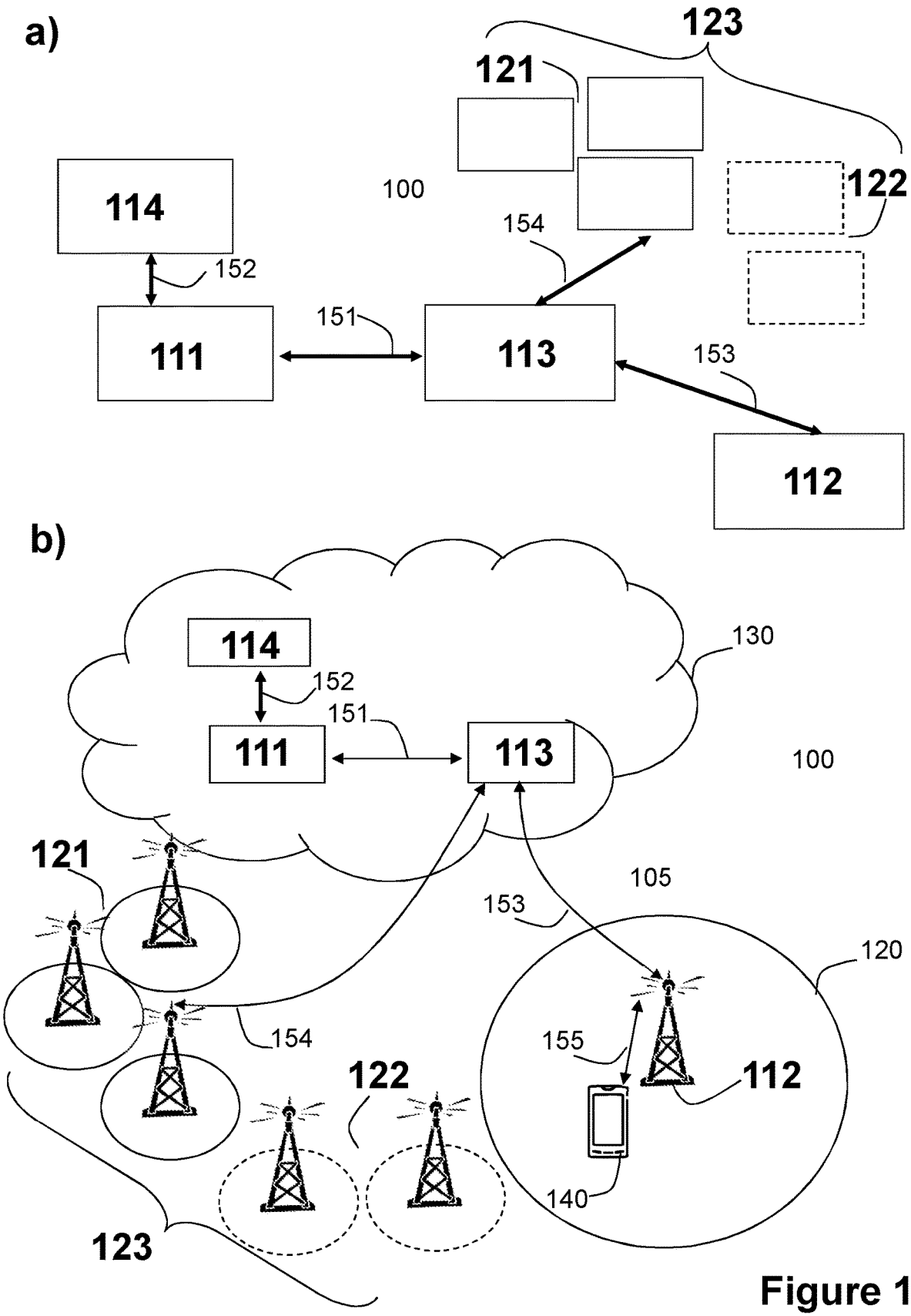
FIG. 1 is a schematic diagram illustrating two non-limiting examples in a) and b), respectively, of a communications network, according to embodiments herein.

FIG. 1 depicts two non-limiting examples, in panels "a" and "b", respectively, of a communications network 100, in which embodiments herein may be implemented. In some example implementations, such as that depicted in the non-limiting example of FIG. 1a), the communications network 100 may be a computer network. The communications network 100 may support a 5G System, or a system with similar functionality. In other example implementations, such as that depicted in the non-limiting example of FIG. 1b), the communications network 100 may be implemented in a telecommunications network 105, sometimes also referred to as a cellular radio system, cellular network or wireless communications system. In some examples, the telecommunications network 105 may comprise network nodes which may serve receiving nodes, such as wireless devices, with serving beams.

In some examples, the telecommunications network 105 may for example be a network such as a 5G system, a 5G Network, or a Next Gen network. The telecommunications network 105 may also support other technologies, such as a Long-Term Evolution (LTE) network, e.g. LTE Frequency Division Duplex (FDD), LTE Time Division Duplex (TDD), LTE Half-Duplex Frequency Division Duplex (HD-FDD), LTE operating in an unlicensed band, Wideband Code Division Multiple Access (WCDMA), Universal Terrestrial Radio Access (UTRA) TDD, GSM/Enhanced Data Rate for GSM Evolution (EDGE) Radio Access Network (GERAN) network, Ultra-Mobile Broadband (UMB), EDGE network, network comprising of any combination of Radio Access Technologies (RATs) such as e.g. Multi-Standard Radio (MSR) base stations, multi-RAT base stations etc., any 3rd Generation Partnership Project (3GPP) cellular network, Wireless Local Area Network/s (WLAN) or WiFi network/s, Worldwide Interoperability for Microwave Access (WiMax), IEEE 802.15.4-based low-power short-range networks such as IPv6 over Low-Power Wireless Personal Area Networks (6LowPAN), Zigbee, Z-Wave, Bluetooth Low Energy (BLE), or any cellular network or system.

The communications network 100 comprises a plurality of nodes, whereof a first node 111, a second node 112, a third node 113 and a fourth node 114 are depicted in FIG. 1. Each of the first node 111, the second node 112, the third node 113 and the fourth node 114 may be understood, respectively, as a first computer system, a second computer system, a third computer system and a fourth computer system.

Any of the first node 111, the second node 112, the third node 113 and the fourth node 114 may be network nodes. In particular examples, the first node 111, the third node 113 and the fourth node 114 may be core network nodes.

The first node 111 may be understood as a node, e.g., a first core network node, having the capability to comprise or manage a Generative Adversarial Network (GAN).

The third node 113 may be understood as a node, e.g., a second core network node, being or having the capability to manage an auto-encoder. That is, a node capable of executing Deep Learning models such as auto-encoders.

The fourth node 114 may be understood as a node, e.g., a third core network node, being or having the capability to manage a Long Short Term Memory auto-encoder. That is, a node capable of executing Deep Learning models such as Long Short Term Memory auto-encoders.

The second node 112 may be a radio network node in a Radio Access Network (RAN) of the telecommunications network 105. The telecommunications network 105 may cover a geographical area, which in some embodiments may be divided into cell areas, wherein each cell area may be served by a radio network node, although, one radio network node may serve one or several cells. In the example of FIG. 1b, the second node 112 serves a cell 120. The second node 112 may be e.g., a gNodeB. That is, a transmission point such as a radio base station, for example an eNodeB, or a Home Node B, a Home eNode B or any other network node capable to serve a wireless device, such as a user equipment or a machine type node in the communications network 100. The second node 112 may be of different classes, such as, e.g., macro eNodeB, home eNodeB or pico base station, based on transmission power and thereby also cell size. In some examples, the radio network node may serve receiving nodes with serving beams. The second node 112 may support one or several communication technologies, and its name may depend on the technology and terminology used. In typical examples of embodiments herein, any reference to the second node 112 may be understood to refer to the second node 112 managing the cell 120. This may be expressed as that the second node 112 may refer to the cell 120, and not to a different cell that may be managed by the same radio network node.

The communications network 100 may comprise other nodes such as the second node 112. Particularly, the communications network 100 comprises a first group of nodes 121. The first group of nodes 121 may be comprised, together with a second group of nodes 122, in a group of nodes 123. Any of the nodes in the group of nodes 123 may be understood, respectively, as a respective computer system. Any of the nodes in the group of nodes 123 may be understood, respectively, as a respective network node. More particularly, any of the nodes in the group of nodes 123 may be understood, respectively, as a respective radio network node, as described above. In typical examples, any of the nodes in the group of nodes 123 may be understood, respectively, as a respective cell, similar to the cell 120, or a respective beam, in the event of beamforming transmission. In such examples, wherein any of the nodes in the group of nodes 123 may be cells or beams, one or more of the nodes in the group of nodes 123 may be managed by a same network node. In other examples herein, any of the nodes in the group of nodes 123 may be understood, respectively, as a respective non-radio network node.

While in FIG. 1, the group of nodes 123 is shown as comprising five nodes, three nodes comprised in the first group of nodes 121, as indicated by the cells with continued lines, and two nodes in the second group of nodes 122, as indicated by the cells with dashed lines, this may be understood to be for illustrative purposes only. The number of nodes comprised in each of the group of nodes 123, the first group of nodes 121 and the second group of nodes 122 may vary and is not limited to the particular example depicted in FIG. 1.

Any of the radio network nodes that may be comprised in the communications network 100 may be directly connected to one or more core networks.

In some examples, any of the first node 111, the third node 113 and the fourth node 114 may be implemented, as depicted in the non-limiting example of FIG. 1b), as a standalone server in e.g., a host computer in the cloud 130. Any of the first node 111, the second node 112, the third node 113, the fourth node 114 and the nodes in the group of nodes 123, may in some examples be a distributed node or distributed server, with some of their respective functions being implemented locally, e.g., by a client manager, and some of its functions implemented in the cloud 130, by e.g., a server manager. Yet in other examples, any of the first node 111, the second node 112, the third node 113, the fourth node 114 and the nodes in the group of nodes 123, may also be implemented as processing resources in a server farm. Any of the first node 111, the third node 113 and the fourth node 114 may be under the ownership or control of a service provider, or may be operated by the service provider or on behalf of the service provider.

Any of the first node 111, the second node 112, the third node 113, the fourth node 114 and the nodes in the group of nodes 123, may be enabled to communicate wirelessly in the communications network 100 and, in some particular examples, may be able support beamforming transmission. The communication may be performed e.g., via a RAN and possibly one or more core networks, comprised within the communications network 100.

Typically, the second node 112 and the nodes in the group of nodes 123 may not be present in the communications network 100 at the same time. The nodes in the group of nodes 123 may be present in the communications network 100 over a time period, and the second node 112 may be present at a different, later time period. It may also be possible that the second node 112 may be comprised in the group of nodes 123.

The communications network 100 may comprise wireless devices, whereof a wireless device 140 is depicted in FIG. 1 b). The wireless device 140 may be also known as e.g., a UE, mobile terminal, wireless terminal and/or mobile station, mobile telephone, cellular telephone, or laptop with wireless capability, or a Customer Premises Equipment (CPE), just to mention some further examples. The wireless device 140 in the present context may be, for example, portable, pocket-storable, hand-held, computer-comprised, or a vehicle-mounted mobile device, enabled to communicate voice and/or data, via a RAN, with another entity, such as a server, a laptop, a Personal Digital Assistant (PDA), or a tablet computer, sometimes referred to as a tablet with wireless capability, or simply tablet, a Machine-to-Machine (M2M) device, a device equipped with a wireless interface, such as a printer or a file storage device, modem, Laptop Embedded Equipped (LEE), Laptop Mounted Equipment (LME), USB dongles or any other radio network unit capable of communicating over a radio link in the communications network 100. Any of the wireless devices may be wireless, i.e., it may be enabled to communicate wirelessly in the communications network 100 and, in some particular examples, may be able support beamforming transmission. The communication may be performed e.g., between two devices, between a device and a radio network node, and/or between a device and a server. The communication may be performed e.g., via a RAN and possibly one or more core networks, comprised, respectively, within the communications network 100.

The first node 111 is configured to communicate within the communications network 100 with the third node 113 over a first link 151, e.g., a radio link, an infrared link, or a wired link. The first node 111 is configured to communicate within the communications network 100 with the fourth node 114 over a second link 152, e.g., a radio link, an infrared link, or a wired link. The second node 112 may communicate with the third node 113 over a third link 153, e.g., a radio link, an infrared link, or a wired link. Any of the nodes in the group of nodes 123 may communicate with the third node 113 over a respective fourth link 154, e.g., a radio link or an infrared link. The second node 112 may communicate with the wireless device 140 over a fifth link 155, e.g., a radio link or an infrared link.

Any of the first link 151, the second link 152, the third link 153, the respective fourth links 154 and the fifth link 155 may be a direct link or a comprise one or more links, e.g., via one or more other network nodes, radio network nodes or core network nodes.

Any of the first link 151, the second link 152, the third link 153, the respective fourth links 154 and the fifth link 155 may be a direct link or it may go via one or more computer systems or one or more core networks in the communications network 100, which are not depicted in FIG. 1, or it may go via an optional intermediate network. The intermediate network may be one of, or a combination of more than one of, a public, private or hosted network; the intermediate network, if any, may be a backbone network or the Internet, which is not shown in FIG. 1.

In general, the usage of "first", "second", "third", "fourth", "fifth" etc. herein may be understood to be an arbitrary way to denote different elements or entities, and may be understood to not confer a cumulative or chronological character to the nouns they modify.

Figure 2:
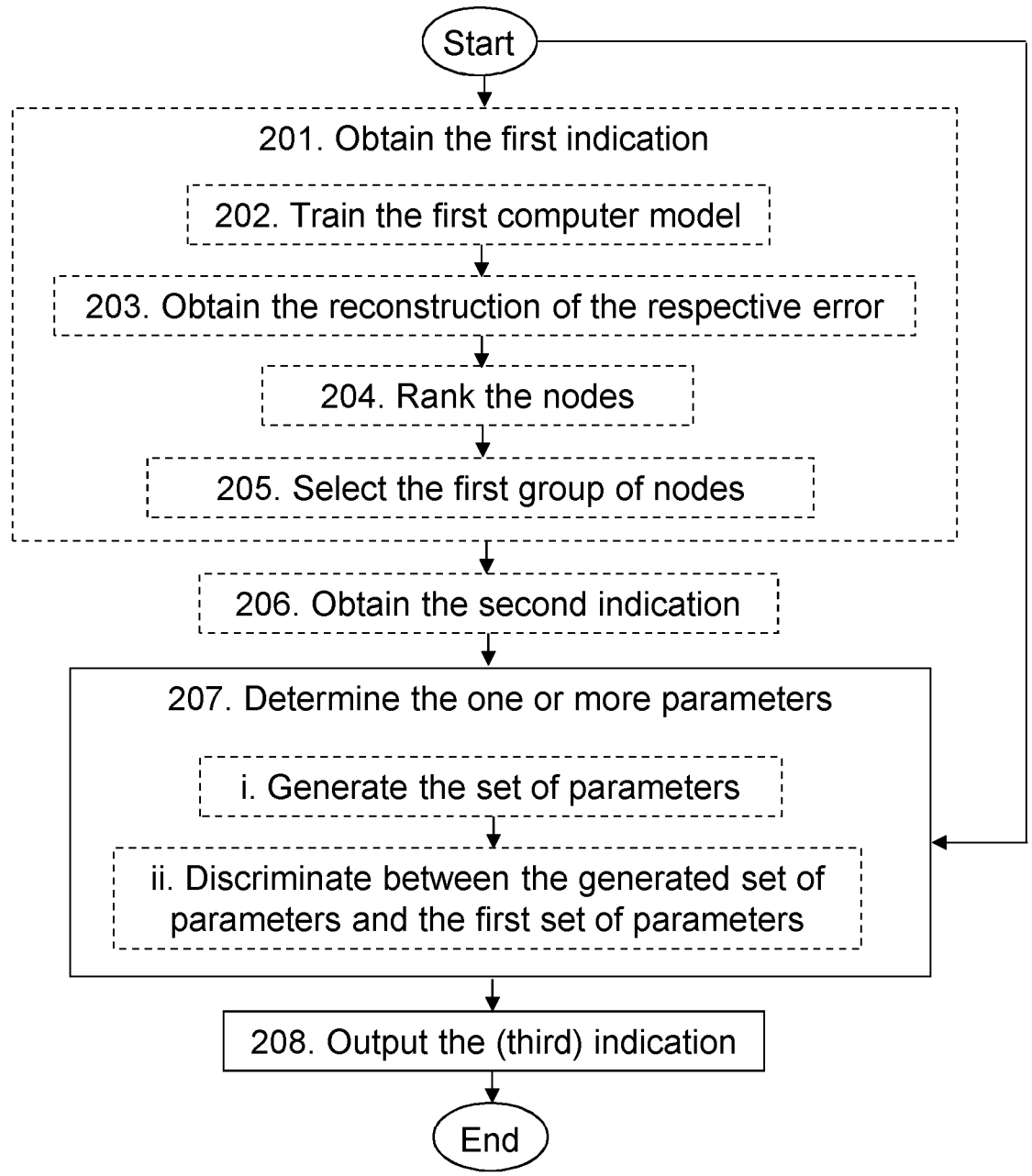
FIG. 2 is a flowchart depicting embodiments of a method in a first node, according to embodiments herein.

Embodiments of a method performed by the first node 111 will now be described with reference to the flowchart depicted in FIG. 2. The method may be understood to be for handling parameters to configure the second node 112. The first node 111 may be understood to operate in the communications network 100. In some examples, the communications network 100 may be a Fifth Generation (5G) network.

The method may comprise the actions described below. In some embodiments, some of the actions may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 2, optional actions are indicated with a dashed box.

Action 201

The ultimate goal of the methods described herein may be understood to be to enable the communications network 100 to perform auto-correction of nodes comprised in the communications network 100, such as the second node 112, which may be performing sub-optimally or poorly, and to recommend suitable parameter changes in such nodes, so they may improve their performance. The parameters discussed herein may be understood to refer to configuration management (CM) parameters. That is, any set of configurable parameters in a node, e.g., a cell, which may directly or indirectly affect the performance of the node, e.g., cell.

To be able to identify which parameter changes may be suitable to improve the performance of the second node 112, or other similar nodes, the first node 111 may first determine, from historical data from other nodes, such as the group of nodes 123, which nodes may have been performing well according to a criterion. Then, the first node 111 may determine which parameters, that is, e.g., which configuration management (CM) parameters, may have been responsible for the good performance of these nodes. The group of nodes 123 may be considered a group of nodes for which historical performance data may have been collected in the communications network 100 over a time period, during which the group of nodes 123 may have been under a plurality of traffic conditions, also recorded. This way, the suitability of different parameter settings to different traffic conditions may also be analyzed. It may be noted that the nodes comprised in the group of nodes 123 may not be always constant. For example, historical data may be considered for a certain time period for analysis. In this time period, node A may be comprised in the group of nodes 123 for certain time, when it may be performing well and, may not be in this group when not performing well.

The performance of the group of nodes 123 may be measured for example, by evaluating a number of call incidents, such as muting, gabling, soft drop, hard drop, access failure etc. For each of the nodes in the group of nodes 123, a data set comprising, call incidents, traffic conditions, such as number of user connections, data transmission related Key Performance Indicators (KPI) etc. . . . , and the corresponding CM parameter settings for the group of nodes 123, e.g., a set of cells, may be recorded every fixed interval. The recorded data set may be considered to have the following structure:

$$\text{Data:} D = \{ < I_1^{c1}, T_1^{c1}, C_1^{c1} >, \ldots , < I_t^{c1}, T_t^{c1}, C_t^{c1} > \},$$

where the incident data of node c at time t is give by $$I_t^c,$$

and the traffic and CM data are similarly given by $$T_t^c \text{ and } C_t^c$$

respectively.

Out of the group of nodes 123, and for a given criterion, e.g., a first threshold, the nodes comprised in the first group of nodes 121 may be considered to be the nodes having a good performance, that is a performance above the first threshold. The second group of nodes 122 may be considered as the nodes having a normal or a poor performance, that is a performance below the first threshold. The first threshold may be a single value. For example, a single score may be computed as a composite value based on a plurality of incidents as a single indication of performance. The first threshold may then be chosen as a value of that score. In typical embodiments, the first threshold may be a value of a deviation or difference from what may be considered a "normal" performance of a node. That is, the first threshold may typically be a value of a reconstruction error, as will be explained later. The skilled person may understand the first threshold may take other forms.

It may also be understood that as long as historical data to perform this analysis have been collected for the second node 112, the second node 112 may itself be comprised in the group of nodes 123. That is, the historical data of the second node 112 may be used for this analysis in order to perform auto-correction of the configuration of parameters of the second node 112 in a future time period. Nevertheless, in typical examples, the second node 112 may not be comprised in the group of nodes 123 used for the historical data analysis.

The analysis of the historical data may be performed by the third node 113, which may be comprised in the first node 111, or co-located with the first node 111, or may be an independent node, as depicted in the non-limiting examples of FIG. 1.

According to the foregoing, in this Action 201, the first node 111 may obtain, from the third node 113 operating in the communications network 100, a first indication. The first indication may indicate a first set of parameters observed to be linked to a performance of the first group of nodes 121 operating in the communications network 100 being above the first threshold. In other words, in this Action 201, the first indication may point to the parameters that correspond the performance of the nodes in the group of nodes 123 performing well.

In some embodiments wherein the third node 113 may be an independent node from the first node 111, the obtaining in this Action 201 may be performed by receiving, e.g., via the first link 151.

In some embodiments, the third node 113 may be an auto-encoder managed by the first node 111.

In such embodiments wherein the third node 113 may be an auto-encoder managed by the first node 111, e.g., co-localized with or comprised in the first node 111, the obtaining 201 of the first set of parameters may further comprise the following actions 202-205:

Action 202

In this Action 202, the first node 111, via the third node 113, may train a first data model with respective data of the nodes comprised in the group of nodes 123 indicative of a respective performance of the nodes over a period of time. As stated earlier, the group of nodes comprises the first group of nodes 121.

A data model may be understood as a computer data model, e.g., a machine-learning model. The first data model may be for example, a Deep Learning based auto-encoder model, etc. . . . .

The respective data of the nodes comprised in the group of nodes 123 indicative of the respective performance of the nodes over the period of time may be understood to be data about one or more incidents, as collected respective for the nodes comprised in the group of nodes 123.

To train the first data model may be understood as an auto-encoder which may be capable of learning what may be normal behaviour of the nodes. In addition, the first node 111, via the third node 113, may also take into consideration how a node is supposed to behave given a certain incident, based on a laboratory deployment, or if possible, when the node may have been first deployed. This information may then be used as input as well in the training of the first data model in this Action 202, in order to better understand any possible deviations from regular behavior.

The first data model may be understood as a mathematical function that best fits, what normal performance of the nodes in the group of nodes 123 may be. All the incidents may be input variables to the first data model.

By training the first data model with the respective data of the nodes comprised in the group of nodes 123 in this Action 202, the first node 111 may be enabled to predict, for any given node, what the expected performance may be, that is the expected values of each of the incidents modeled, and therefore, detect any performance which may deviate from the expected performance, as explained next.

Action 203

In this Action 203, the first node 111, via the third node 113, may obtain a reconstruction of a respective error of the trained first data model for each of the nodes in the group of nodes 123. The respective error may be understood as a reconstruction error of the auto-encoder. The auto-encoder may be understood to learn what should be the normal behaviour, e.g., in terms of the incidents, for a given set of incidents of a node, which when fed to the auto-encoder, may provide a reconstruction error. The higher the reconstruction error, the higher the deviation from normal behaviour. The auto-encoder may be understood to directly output the error. The respective error may therefore be an indicator of a deviation from normal behavior.

By obtaining the reconstruction of the respective error of the trained first data model for each of the nodes in the group of nodes 123 in this Action 203, the first node 111 may be enabled to determine which nodes in the group of nodes 123 deviate from normal behavior, and by how much, as explained next.

Action 204

In this Action 204, the first node 111, via the third node 113, may rank, or score, the nodes comprised in the group of nodes 123, based on their respective reconstructed error. The ranking thus obtained may then be used to separate the collected data D into tuples when the nodes in the group of nodes 123 may be performing well, and those that are performing badly, i.e., $D=D_{good} \cup D_{bad}$. The collected data D nodes that may be performing well, $D_{good}$, may be understood to indicate that the parameters as configured in these nodes may be set right, e.g., for a given traffic condition The reasoning behind this is the that normal behavior of the nodes in the group of nodes 123 modeled by the third node 113 with higher reconstruction errors may be understood to be those deviating from normal behavior for the better, namely, with the best observed performance. By ranking, or scoring, the nodes comprised in the group of nodes 123, based on their respective reconstructed error in this Action 204, the first node 111 may be enabled to determine which nodes in the group of nodes 123 deviate most from normal behavior, that is which nodes in the group of nodes 123 have the highest respective reconstructed error.

Action 205

In this Action 205, the first node 111, via the third node 113, may select the first group of nodes 121 from the group of nodes 123, based on their respective reconstructed error being above the first threshold.

By selecting the first group of nodes 121 from the group of nodes 123 in this Action 205, the nodes comprised in the group of nodes 123 having the best performance may be identified, which then enables that their parameter settings may be evaluated, so that the first set of parameters mentioned in Action 201 may be identified, and suitable configuration of parameters may be recommended to other nodes to optimize, improve or correct their performance in the communications network 100, given similar circumstances, e.g., similar traffic conditions, as will be explained later.

The obtained first set of parameters may be later be used in Action 207, particularly in the generating and the discriminating in an analysis that will be explained in detail, later in Action 207.

Action 206

As mentioned earlier, the historical data collected for the group of nodes 123, that is, the respective data of the nodes comprised in the group of nodes 123 indicative of the respective performance of the nodes over the period of time, may comprise the traffic conditions associated to the observed performance data.

In this Action 206, the first node 111 may obtain, from the fourth node 114 operating in the communications network 100, a second indication. The second indication may indicate a fixed length vector encoding a plurality of traffic conditions observed to be linked to the performance of the first group of nodes 121 operating in the communications network 100, that is, of the nodes in the group of nodes 123 having the best performance. The obtained fixed length vector may be used in Action 207, particularly in the generating and the discriminating in the analysis that will be explained in detail, later in Action 207.

In some embodiments, wherein the fourth node 114 may be an independent node from the first node 111, the obtaining in this Action 206 may be performed by receiving, e.g., via the second link 152.

The traffic conditions of nodes, such as cells, may be understood to vary with time. Hence, the nature of these data may be understood to be sequential in nature and hence the data may be modelled using a Long Short Term Memory (LSTM) encoder-decoder architecture similar to those used for Machine Translation. The LSTM encoder, with input as the traffic conditions, may output an encoded vector which may represent the traffic conditions observed over a period of time. This encoder vector may be understood to be representative of the traffic time series for a node comprised in the first group of nodes 121. Accordingly, in some embodiments, the fourth node 114 may manage an LSTM auto-encoder.

In some embodiments, the fourth node 114 may be managed by the first node 111, and may manage an LSTM auto-encoder.

In further particular embodiments, the plurality of traffic conditions may vary over time, and the fourth node 114 may be managed by the first node 111, and may manage an LSTM auto-encoder to generate the fixed length vector. In some of such embodiments, the obtaining in this Action 206 may comprise training a second data model with respective sequential traffic data of the nodes comprised in the first group of nodes 121 to encode the respective sequential traffic data into the fixed length vector.

The second data model may be an LSTM auto-encoder model. Accordingly, Traffic over time may be encoded as fixed length vector: $ET_t$, using the LSTM auto-encoder model.

By obtaining the second indication in this Action 206, the first node 111 may be enabled to, as explained in the next Action 207, determine one or more parameters to configure the second node 112 for operation to deliver a service in the communications network 100, and to do it based on different traffic conditions. In other words, the first node 111 may be enabled to determine which parameters may be most suitable to configure the second node 112 with, given a certain traffic condition, in order to obtain a good performance.

Action 207

In this Action 207, the first node 111 determines one or more parameters to configure the second node 112 for operation to deliver a service in the communications network 100. The service may be understood to be a function that may be used by a device operating in the communications network, e.g., radio coverage. In other words, in this Action 207, the first node 111 applies the knowledge learned on the parameters that may be best suited to result in the best performance of the first group of nodes 121, e.g., for given similar conditions, such as traffic, to the second node 112, as will be explained later. It may be understood that the second node 112 is just an illustrative example, and that the methods described herein may be applied to any node.

The determining, in this Action 207, of the one or more parameters, is based on an analysis performed by a Generative Adversarial Network (GAN), managed by the first node 111. The analysis comprises performing iteratively the following actions: i) generating a set of parameters estimated to be linked to the performance of the first group of nodes 121 operating in the communications network 100 being above the first threshold, and ii) discriminating between the generated set of parameters, and the first set of parameters observed to be linked to the performance of the first group of nodes 121 being above the first threshold as obtained in Action 201, to obtain a respective score for every parameter. The respective score indicates how different the generated set of parameters and the first set of parameters are. In other words, the first node 111, in this Action 207, may via a discriminator, learn to provide a score on how close the generated set of parameters may be to the data actually collected or recorded from the first group of nodes 121 in Action 201.

To generate the set of parameters in action i) may be understood as obtaining the CM parameters, e.g., for a given traffic condition, which may be necessary for good performance of a node. It may be understood that in Action 201, real data may be obtained for training. As there may be understood to be infinite possible scenarios, the real data cannot possibly hold all possible scenarios. The goal of generating the set of parameters may be understood to be to "fill in the gaps". That is, to recommend CM parameters for improving performance of a given node, e.g., given a currently observed traffic condition.

In some embodiments, the GAN may be a conditional GAN. That is, a type of GAN that may be understood to learn to sample/generate points from a distribution conditioned over certain characteristics or attributes.

In such embodiments, wherein the GAN may be a conditional GAN, performing the analysis may further comprise conditioning based on the plurality of traffic conditions. In such embodiments, the determined one or more parameters may comprise a plurality of sets of one or more parameters. Each set in the plurality of sets of one or more parameters may be determined for a different traffic condition in the plurality of traffic conditions. That is, for example, a first set of one or more parameters may be determined for when traffic is high, and a second set of one or more parameters may be determined for when the traffic is low.

In some embodiments, the determining in this Action 207 may comprise a first phase and a second phase. The first phase may comprise performing the generating and the discriminating by: i. training the GAN with the first set of parameters observed to be linked to the performance of the first group of nodes 121 being above the first threshold and the plurality of traffic conditions to obtain a data model, e.g., a total model or third data model, of the parameters based on the plurality of traffic conditions. In other words, the first phase may comprise training a conditional GAN for the, e.g., CM parameters of the nodes which may have been identified as good performing for a certain time period, that is, on data $D_{good}$ in Actions 201-205, and the parameters may be conditioned over the plurality of traffic conditions represented by the encoded vector obtained in Action 206.

The second phase may comprise: ii) executing the data model, that is, the third data model, by inputting a first set of observed traffic conditions as a first fixed length vector, and iii) determining the one or more parameters corresponding to the first set of observed traffic conditions, based on the obtained data model, that is the third data model.

Explained differently, the first phase may comprise training the Generator part of the conditional GAN to generate ideal CM parameters for given traffic conditions. The generator may be being trained to learn the P (C|ET), that is, the distribution of the CM parameters C given some traffic conditions observed over a time period, which may have been encoded as ET.

During the prediction or second phase, the first node 111 may generate several parameter outputs from the Generator for a given traffic situation until the discriminator may pass the generated parameters with an acceptable score. Then, these parameters may be suggested to be set for a given node such as the second node 112, for a given traffic situation. Accordingly, the determined one or more parameters in this Action 207 have the respective score resulting from the discriminating being lower than a second threshold. In other words, the determined one or more parameters are those being the most similar to the observed parameters, namely, the first set of parameters.

To succinctly summarize what this Action 207 may entail: a data model to predict parameters, e.g., given certain traffic conditions, based on the configuration parameters of the best performing nodes is first built by iterations, until predicted data obtained with the data model cannot be distinguished from real, observed data. Then, the built model is used to output the parameters to be used, given real traffic conditions, to obtain the best performance of the second node 112.

By determining the one or more parameters to configure the second node 112 in this Action 207, the first node 111 is enabled to auto-correct the configuration of the second node 112 with the determined one or more parameters, so that the performance of the second node 112, e.g., given similar conditions such as traffic, may be corrected to be as similar as possible to that observed in the first group of nodes 121, namely, the best performing nodes of the group of nodes 123.

Action 208

In this Action 208, the first node 111 may output an indication, e.g., a third indication, comprising the determined one or more parameters. Outputting may be understood as providing, or rendering, either internally, e.g., to another node within the first node 111, or by sending the third indication to another, externally located, node.

By outputting the third indication in this Action 208, indicating the determined one or more parameters, the first node 111 may enable an automated methodology to tune CM parameters of the second node 112 remotely, so that their configuration may be best fitted with their changing traffic scenario to prevent a degradation of the performance of the second node 112, or even to improve its performance.

Figure 3:
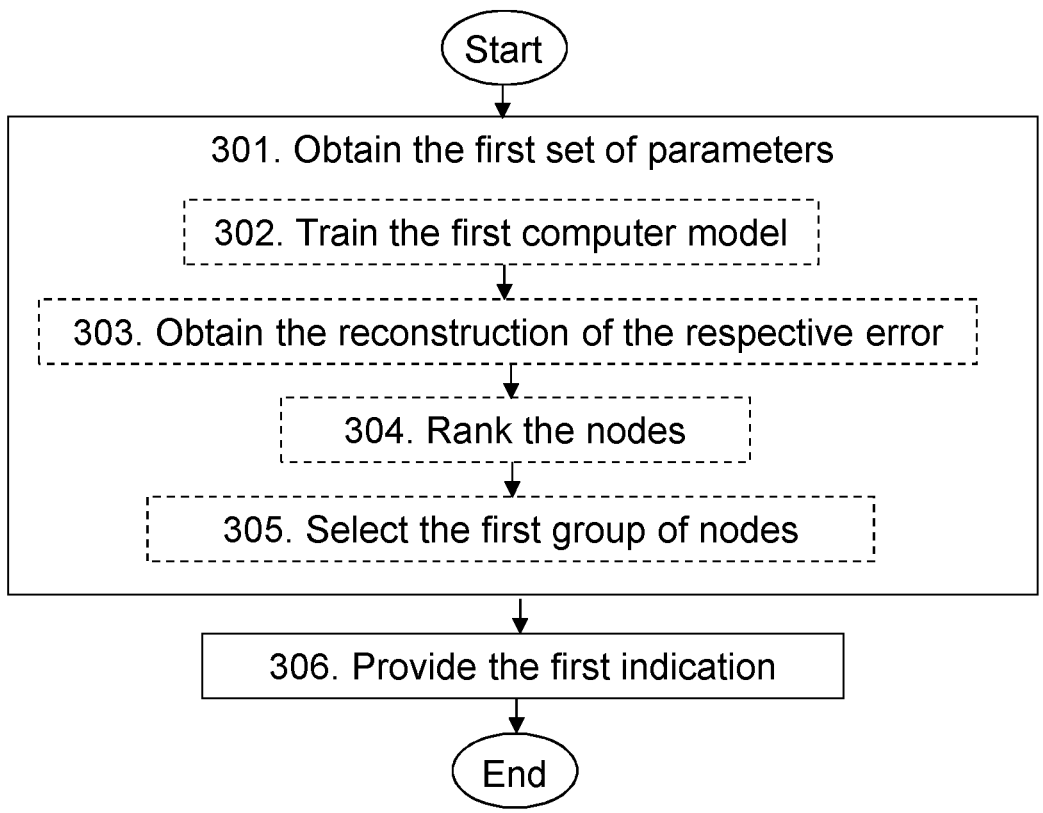
FIG. 3 is a flowchart depicting embodiments of a method in a third node, according to embodiments herein.

Embodiments of method performed by the third node 113 will now be described with reference to the flowchart depicted in FIG. 3. The method may be understood to be for handling parameters to configure the second node 112. The third node 113 is an auto-encoder operating in the communications network 100.

The method may comprise the actions described below. In some embodiments, some of the actions may be performed. In some embodiments, all the actions may be performed. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples. In FIG. 3, optional actions are indicated with a dashed box. The detailed description of some of the following corresponds to the same references provided above, in relation to the actions described for the first node 111, and will thus not be repeated here. For example, parameters may be CM parameters.

The description of the following actions may be understood to correspond to the Actions 202-205, described to be performed by the first node 111 in embodiments wherein the first node 111 manages the third node 113. Any further details of the method may be found in the description provided for Actions 202-205.

Action 301

In this Action 301, the third node 113 obtains, the first set of parameters observed to be linked to the performance of the first group of nodes 121 operating in the communications network 100 being above the first threshold. The first set of parameters are parameters to configure the second node 112 for operation to deliver a service in the communications network 100.

Obtaining in this Action 301 may be understood as determining, calculating or deriving.

The obtaining in this Action 301 of the first set of parameter may further comprise the following actions 302-305:

Action 302

In this Action 302, the third node 113 trains the first data model the respective data of the nodes comprised in the group of nodes 123 indicative of the respective performance of the nodes over the period of time. As stated earlier, the group of nodes comprises the first group of nodes 121. The first data model may be for example, a Deep learning based auto-encoder model.

By training the first data model with the respective data of the nodes comprised in the group of nodes 123 in this Action 302, the third node 113 may enable to predict, or eventually enable the first node to predict, for any given node, what the expected performance may be, that is the expected values of each of the incidents modeled, and therefore, detect any performance which may deviate from the expected performance, as explained next.

Action 303

In this Action 303, the third node 113, obtains the reconstruction of the respective error of the trained first data model for each of the nodes in the group of nodes 123.

By obtaining the reconstruction of the respective error of the trained first data model for each of the nodes in the group of nodes 123 in this Action 203, the third node 113 may be enabled to determine which nodes in the group of nodes 123 deviate from normal behavior, and by how much, as explained next.

Action 304

In this Action 304, the first node 111, via the third node 113, ranks or scores, the nodes comprised in the group of nodes 123, based on their respective reconstructed error.

By ranking, or scoring, the nodes comprised in the group of nodes 123, based on their respective reconstructed error in this Action 304, the third node 113 may be enabled to determine which nodes in the group of nodes 123 deviate most from normal behavior, that is which nodes in the group of nodes 123 have the highest respective reconstructed error.

Action 305

In this Action 305, the third node 113 selects the first group of nodes 121 from the group of nodes 123, based on their respective reconstructed error being above the first threshold.

By selecting the first group of nodes 121 from the group of nodes 123 in this Action 205, the nodes comprised in the group of nodes 123 having the best performance may be identified, which then enables that their parameter settings may be evaluated, so that the first set of parameters mentioned in Action 301 may be identified, and suitable configuration of parameters may be recommended to other nodes to optimize, improve or correct their performance in the communications network 100, given similar circumstances, e.g., similar traffic conditions, as will be explained later.

Action 306

In this Action 306, the third node 113 provides, to the first node 111 operating in the communications network 100, the first indication indicating the obtained first set of parameters In other words, in this Action 306, the first indication may point to the parameters that correspond the performance of the nodes in the group of nodes 123 performing well.

The first indication may for example be a list of cells, a message, etc. . . . . .

In some embodiments, the first set of parameters may comprise the first plurality of sets of first one or more parameters, each set in the first plurality of sets of first one or more parameters corresponding to a different traffic condition in the plurality of traffic conditions.

The first set of parameters may then be used by the first node 111 as input to the GAN to determine the one or more parameters. Therefore, by providing the first indication in this Action 306, the third node 113 may enable the first node 111 to, as explained earlier in Action 207, determine the one or more parameters to configure the second node 112 for operation, in order for the second node 112 to obtain a good performance. In some embodiments, this determination may be enabled for different traffic conditions.

Figure 4:
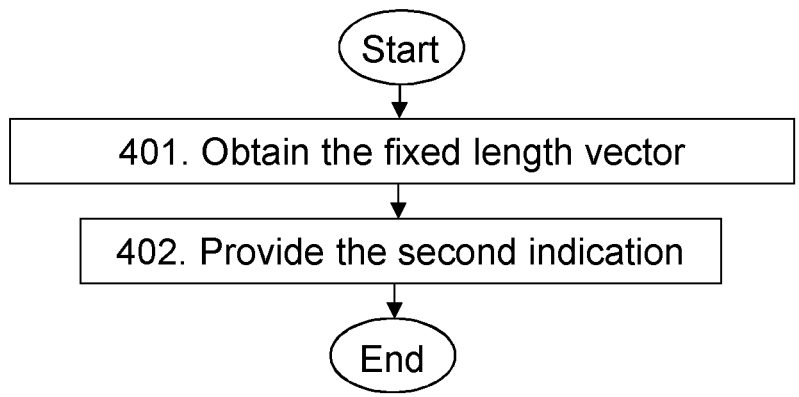
FIG. 4 is a flowchart depicting embodiments of a method in a fourth node, according to embodiments herein.

Embodiments of method performed by the fourth node 114 will now be described with reference to the flowchart depicted in FIG. 4. The method may be understood to be for handling parameters to configure the second node 112. The fourth node 114 operates in the communications network 100.

The method comprises the actions described below. One or more embodiments may be combined, where applicable. All possible combinations are not described to simplify the description. It should be noted that the examples herein are not mutually exclusive. Components from one example may be tacitly assumed to be present in another example and it will be obvious to a person skilled in the art how those components may be used in the other examples.

The detailed description of some of the following corresponds to the same references provided above, in relation to the actions described for the first node 111, and will thus not be repeated here. For example, the parameters may be CM parameters.

The description of the following actions may be understood to correspond to the Action 206, described to be performed by the first node 111 in embodiments wherein the first node 111 manages the fourth node 114. Any further details of the method may be found in the description provided for Actions 206.

Action 401

As mentioned earlier, the historical data collected for the group of nodes 123, that is, the respective data of the nodes comprised in the group of nodes 123 indicative of the respective performance of the nodes over the period of time, may comprise the traffic conditions associated to the observed performance data.

In this Action 206, the fourth node 114 obtains the fixed length vector encoding the plurality of traffic conditions observed to be linked to the performance of the first group of nodes 121 operating in the communications network 100, that is, of the nodes in the group of nodes 123 having the best performance. The obtained fixed length vector may be used in the generating and the discriminating in the analysis, as described earlier.

The obtaining in this Action 401 comprises training the second data model with respective sequential traffic data of the nodes comprised in the first group of nodes 121 to encode the respective sequential traffic data into the fixed length vector.

In some embodiments, the plurality of traffic conditions may vary over time, and the fourth node 114 may manage an LSTM auto-encoder to obtain the fixed length vector.

The second data model may be an LSTM auto-encoder model. Accordingly, Traffic over time may be encoded as fixed length vector: $ET_t$ using the LSTM auto-encoder model.

The fixed length vector may then be used by the first node 111 as input to the GAN to determine the one or more parameters. By obtaining the fixed length vector in this Action 401, the fourth node 114 may be enabled to provide the second indication in the next Action 402, and enable the first node 111 to, as explained in Action 207, determine the one or more parameters to configure the second node 112 for operation to deliver the service in the communications network 100, and to do it based on different traffic conditions. In other words, the fourth node 114 may enable the first node 111 to determine which parameters may be most suitable to configure the second node 112 with, given a certain traffic condition, in order to obtain a good performance.

Action 402

In this Action 402, the fourth node 114 provides, to the first node 111 operating in the communications network 100, the second indication. The second indication indicates the obtained fixed length vector encoding the plurality of traffic conditions.

By providing the second indication in this Action 402, the fourth node 114 enables the first node 111 to, as explained in Action 207, determine the one or more parameters to configure the second node 112 for operation to deliver the service in the communications network 100, and to do it based on different traffic conditions. In other words, the fourth node 114 may enable the first node 111 to determine which parameters may be most suitable to configure the second node 112 with, given a certain traffic condition, in order to obtain a good performance.

Figure 5:
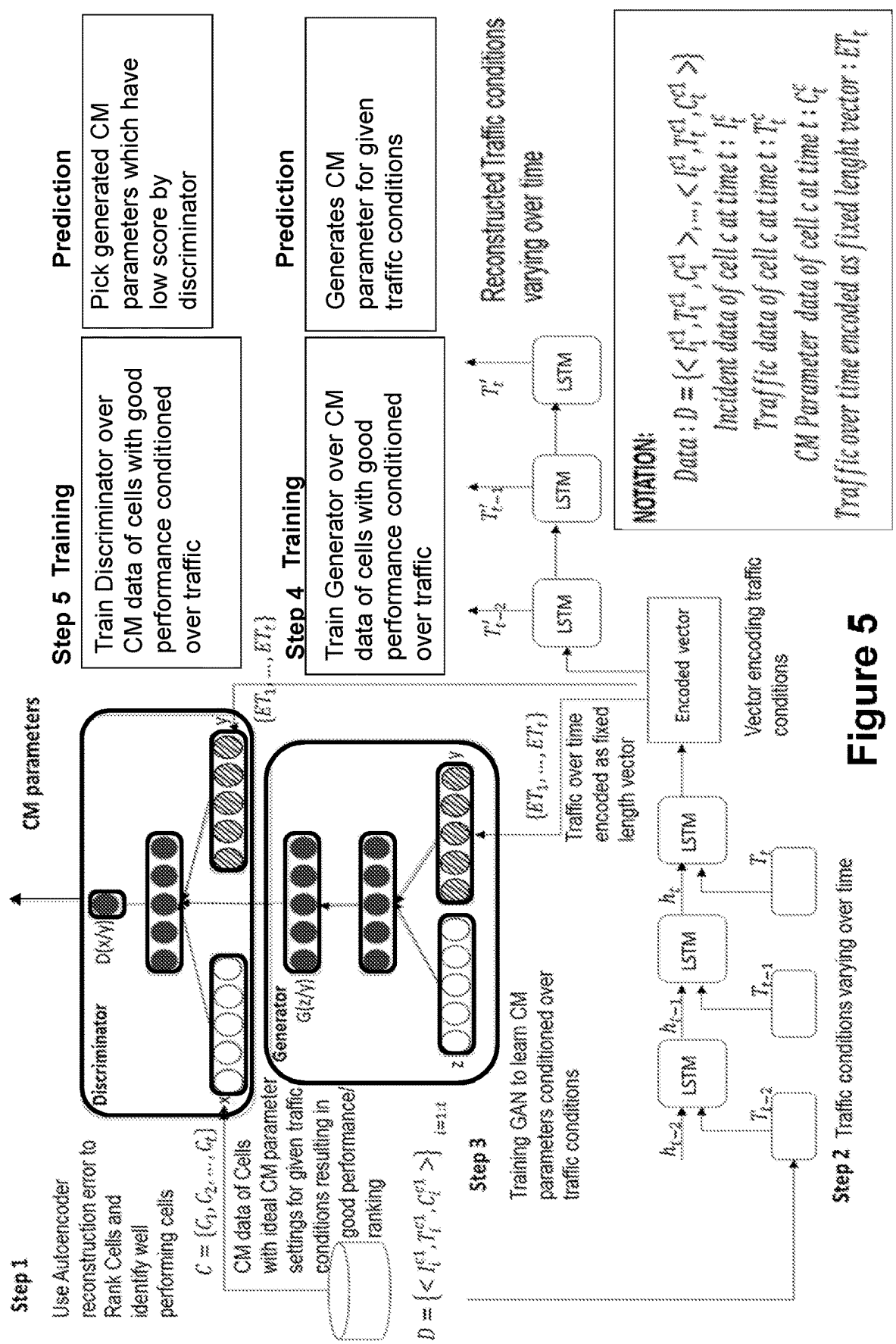
FIG. 5 is a flowchart depicting a non-limiting example of a method in a communications network, according to embodiments herein.

FIG. 5 is a schematic diagram depicting a non-limiting example of how the first node 111, the third node 113 and the fourth node 114 may interact in the communications network 100 to perform the methods described above.

The method may start with the data set described earlier comprising both call incidents, traffic conditions, and the parameter settings for the group of nodes 123, e.g., a set of cells, being recorded every fixed interval.

$$\text{Data:} D = \{ <I_1^{c1}, T_1^{c1}, C_1^{c1}>, \ldots, <I_t^{c1}, T_t^{c1}, C_t^{c1}> \},$$

where the incident data of cell c at time t is given by $$I_t^c,$$

the traffic and the parameter data are similarly given by $$T_t^c \text{ and } C_t^c$$

respectively. At Step 1, the third node 113, an auto-encoder, trains the first computer model in Action 302, obtains the reconstruction of the respective error in Action 303, and uses the reconstruction error as first threshold in Action 304 to rank the nodes, here cells, and to identify the well performing cells, which it selects in Action 305. Then, according to Action 301, it obtains the first set of parameters. That is, the configuration management data of the nodes with ideal CM parameter settings for given traffic conditions resulting in good performance and/or ranking. In Action 306, the third node 113 provides the first indication to the first node 111, which uses the first indication as input to the Discriminator according to Action 201. At Step 2, the fourth node 114, according to Action 401, manages a LSTM auto-encoder to obtain the fixed length vector encoding the plurality of traffic conditions varying over time as ET. Then, in agreement with Action 402, the fourth node 114 provides the second indication to the first node 111 as input to the Discriminator. At Step 3, the first node 111 determines the one or more parameters by training the GAN with the first set of parameters observed to be linked to the performance of the first group of nodes 121 being above the first threshold and the plurality of traffic conditions to obtain a data model of the parameters based on the plurality of traffic conditions. Expressed differently, in this example, the first node 111 may be understood to train a conditional GAN for the CM parameters of cells which were identified as good performing, for a certain time period, that is, on data $D_{good}$ in Step 1. The GAN may be conditioned over the traffic conditions represented by the encoded vector obtained in Step 2. At Step 4, the generator part of the conditional GAN is trained, according to Action 207, to generate ideal parameters for given traffic conditions. The generator is trained to learn the P (C|ET), i.e., the distribution of the CM parameters C given some traffic conditions observed over a time period, which has been encoded as ET. At Step 5, the discriminator part of the conditional GAN learns, according to Action 207, to provide a score on how close the generated CM parameters are to what was observed in the training data. During the prediction phase, the first node 111 generates several CM Parameter outputs from the generator for a given traffic situation till the discriminator passes it with an acceptable score. Then these CM parameters are suggested to be set for a given cell for a given traffic situation, according to Action 208.

As an summarized overview, embodiments herein may be understood to provide a machine learning-driven approach for automatic detection of bad performing nodes, e.g., cells, on a daily level, and enabling to perform any necessary correction on the CM parameters in this nodes to improve their performance. The second node 112 is used herein as an example of such a node. However, it may be understood that a same node may perform poorly during a certain time period, and well in a different time period, e.g., based on the circumstances such as traffic. Embodiments herein may be understood to enable a mechanism to monitor the key performance measure of the node, and identify the nodes when their performance may be degrading by studying the statistical parameters of the incidences recorded from each node. Expressed differently, embodiments herein may be understood to provide a method for better diagnosing the potential bad performing nodes in advance based on the historical trend of incidences obtained from the nodes, and estimating which CM parameters may be likely to change the performance, and then taking any necessary action so that degradation of the performance of the nodes may be prevented.

One advantage of embodiments herein is that the ranking of the nodes, e.g., cells, based on recent historical performance, enables to identify the bad performing cells in an automatic manner, so that an instantaneous necessary correction may be performed, thereby improving their performance.

Embodiments herein enable to identify the CM parameters that may be responsible for the bad performance of the nodes and enable to auto correct the CM parameters to bring back the performance of the nodes to their optimal level.

A further advantage of embodiments herein is that, in this auto correction methodology, the OPEX cost of the sites may be reduced or minimized.

Another advantage of embodiments herein is that they may enable to provide a better Quality of Experience (QoE) to users.

Yet a further advantage of embodiments herein is that they may enable to ensure that customer experience is not impacted heavily.

Moreover, as an additional advantage, embodiments herein may be understood to enable that less visit to the sites are performed, as remote monitoring may be understood to enable saving a lot of productive hours of field engineers.

Figure 6:
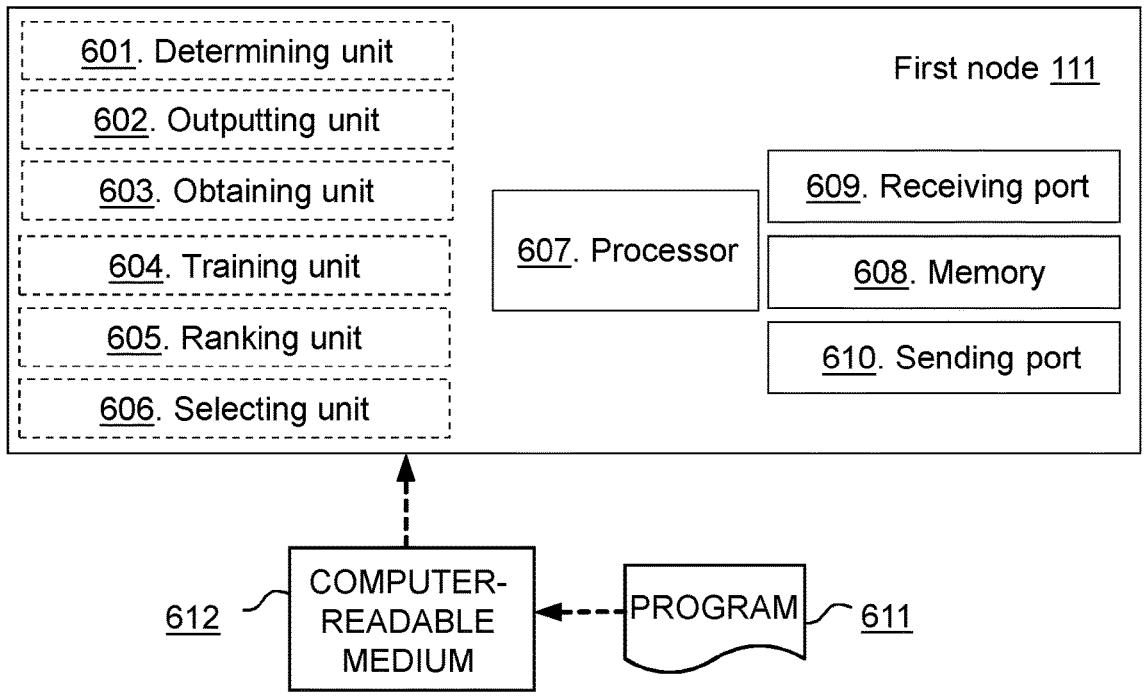
FIG. 6 is schematic block diagram illustrating two non-limiting examples, a) and b), of a first node, according to embodiments herein.
Figure 6:
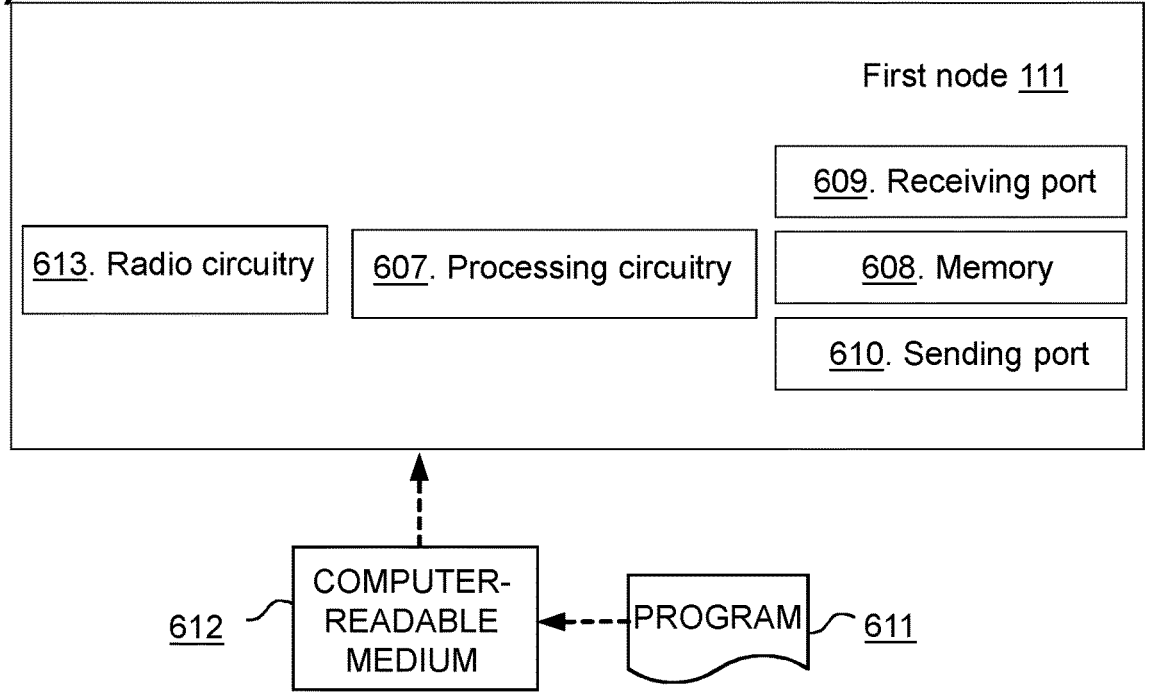

FIG. 6 depicts two different examples in panels a) and b), respectively, of the arrangement that the first node 111 may comprise to perform the method actions described above in relation to FIG. 2 FIG. 5. The first node 111 for handling parameters to configure the second node 112. The first node 111 is configured to operate in the communications network 100.

The detailed description of some of the following corresponds to the same references provided above, in relation to the actions described for the first node 111, and will thus not be repeated here. For example, the parameters may be CM parameters. In FIG. 6, optional units are indicated with dashed lines.

In some embodiments, the first node 111 may comprise the following arrangement depicted in FIG. 6a.

The first node 111 is configured to, e.g. by means of a determining unit 601 within the first node 111 configured to, determine the one or more parameters to configure the second node 112 for operation to deliver a service in the communications network 100. To determine is configured to be based on the analysis configured to be performed by the GAN, configured to be managed by the first node 111. The analysis is configured to comprise performing iteratively: i) generating the set of parameters estimated to be linked to the performance of the first group of nodes 121 configured to operate in the communications network 100 being above the first threshold, and ii) discriminating between the set of parameters configured to be generated and the first set of parameters observed to be linked to the performance of the first group of nodes 121 being above the first threshold to obtain the respective score for every parameter. The respective score is configured to indicate how different the generated set of parameters and the first set of parameters are. The one or more parameters configured to be determined are configured to have the respective score resulting from the discriminating lower than the second threshold.

The first node 111 is also configured to, e.g. by means of an outputting unit 602 within the first node 111 configured to, output the indication comprising the one or more parameters configured to be determined.

In some embodiments, the GAN may be configured to be a conditional GAN. In such embodiments, performing the analysis may be further configured to comprise conditioning based on the plurality of traffic conditions. The one or more parameters configured to be determined may be configured to comprise the plurality of sets of one or more parameters. Each set in the plurality of sets of one or more parameters may be configured to be determined for a different traffic condition in the plurality of traffic conditions.

In some embodiments, to determine may be configured to comprise the first phase and the second phase. The first phase may be configured to comprise performing the generating and the discriminating by: i) training the GAN. The training of the GAN is configured to be with the first set of parameters configured to be observed to be linked to the performance of the first group of nodes 121 being above the first threshold and the plurality of traffic conditions. This is to obtain the data model of the parameters based on the plurality of traffic conditions. The second phase may be configured to comprise: ii) executing the data model by inputting the first set of observed traffic conditions as the first fixed length vector, and iii) determining the one or more parameters corresponding to the first set of observed traffic conditions, based on the data model configured to be obtained.

In some embodiments, the third node 113 may be further configured to, e.g. by means of an obtaining unit 603 within the first node 111 configured to, obtain, from the third node 113 configured to operate in the communications network 100, the first indication. The first indication is configured to indicate the first set of parameters configured to be observed to be linked to the performance of the first group of nodes 121 being above the first threshold. The first set of parameters configured to be obtained is configured to be used in the generating and the discriminating in the analysis.

In some embodiments wherein the third node 113 may be an auto-encoder configured to be managed by the first node 111, the obtaining of the first set of parameters may be further configured to comprise the following. i) Training, e.g. by means of a training unit 604 within the first node 111 configured to, train the first data model with the respective data of nodes configured to be comprised in the group of nodes 123 indicative of the respective performance of the nodes over the period of time. The group of nodes 123 are configured to comprise the first group of nodes 121. ii) Obtaining, e.g. by means of the obtaining unit 603 within the first node 111 configured to, obtain the reconstruction of the respective error of the first data model configured to be trained for each of the nodes in the group of nodes 123. ii) Ranking, e.g. by means of a ranking unit 605 within the first node 111 configured to, rank the nodes configured to be comprised in the group of nodes 123 based on their respective reconstructed error. Additionally, iv) selecting, e.g. by means of a selecting unit 605 within the first node 111 configured to, select the first group of nodes 121 from the group of nodes 123 based on their respective error configured to be reconstructed being above the first threshold.

In some embodiments, the first node 111 may be further configured to, e.g. by means of the obtaining unit 603 within the first node 111 configured to, obtain from the fourth node 114 configured to operate in the communications network 100, the second indication. The second indication is configured to indicate the fixed length vector encoding the plurality of traffic conditions configured to be observed to be linked to the performance of the first group of nodes 121 configured to operate in the communications network 100. The fixed length vector configured to be obtained may be configured to be used in the generating and the discriminating in the analysis.

In some embodiments, the plurality of traffic conditions may vary over time. In some of such embodiments, the fourth node 114 may be configured to be managed by the first node 111, and may be configured to manage an LSTM auto-encoder to generate the fixed length vector. The obtaining may be configured to comprise training the second data model with the respective sequential traffic data of the nodes configured to be comprised in the first group of nodes 121 to encode the respective sequential traffic data into the fixed length vector.

The embodiments herein may be implemented through one or more processors, such as a processor 607 in the first node 111 depicted in FIG. 6a, together with computer program code for performing the functions and actions of the embodiments herein. The processor 607 may be understood herein to be a hardware component. The program code mentioned above may also be provided as a computer program product, for instance in the form of a data carrier carrying computer program code for performing the embodiments herein when being loaded into the in the first node 111. It is however feasible with other data carriers such as a memory stick. The computer program code may furthermore be provided as pure program code on a server and downloaded to the first node 111.

The first node 111 may further comprise a memory 608 comprising one or more memory units. The memory 608 is arranged to be used to store obtained information, store data, configurations, schedulings, and applications etc. to perform the methods herein when being executed in the first node 111.

In some embodiments, the first node 111 may receive information from, e.g., the second node 112, the third node 113, the fourth node 114 and/or the group of nodes 123, through a receiving port 609. In some examples, the receiving port 609 may be, for example, connected to one or more antennas in first node 111. In other embodiments, the first node 111 may receive information from another structure in the communications network 100 through the receiving port 609. Since the receiving port 609 may be in communication with the processor 607, the receiving port 609 may then send the received information to the processor 607. The receiving port 609 may also be configured to receive other information.

The processor 607 in the first node 111 may be further configured to transmit or send information to e.g., the second node 112, the third node 113, the fourth node 114 and/or the group of nodes 123, through a sending port 610, which may be in communication with the processor 607, and the memory 608.

Any of the units 601-606 described in relation to FIG. 6 may be the processor 607 of the first node 111, or an application running on such processor.

Those skilled in the art will also appreciate that any of the units 601-606 described in relation to FIG. 6 described above may refer to a combination of analog and digital circuits, and/or one or more processors configured with software and/or firmware, e.g., stored in memory, that, when executed by the one or more processors such as the processor 607, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the first node 111 may be respectively implemented by means of a computer program 611 product, comprising instructions, i.e., software code portions, which, when executed on at least one processor 607, cause the at least one processor 607 to carry out the actions described herein, as performed by the first node 111. The computer program 611 product may be stored on a computer-readable storage medium 612. The computer-readable storage medium 612, having stored thereon the computer program 611, may comprise instructions which, when executed on at least one processor 607, cause the at least one processor 607 to carry out the actions described herein, as performed by the first node 111. In some embodiments, the computer-readable storage medium 612 may be a non-transitory computer-readable storage medium, such as memory stick, or stored in the cloud space. In other embodiments, the computer program 611 product may be stored on a carrier containing the computer program, wherein the carrier is one of an electronic signal, optical signal, radio signal, or the computer-readable storage medium 612, as described above.

The first node 111 may comprise an interface unit to facilitate communications between the first node 111 and other nodes or devices, e.g., the second node 112, the third node 113, the fourth node 114 and/or the group of nodes 123. In some particular examples, the interface may, for example, include a transceiver configured to transmit and receive radio signals over an air interface in accordance with a suitable standard.

In other embodiments, the first node 111 may comprise the following arrangement depicted in FIG. 6b. The first node 111 may comprise a processing circuitry 607, e.g., one or more processors such as the processor 607, in the first node 111 and the memory 608. The first node 111 may also comprise a radio circuitry 613, which may comprise e.g., the receiving port 609 and the sending port 610. The processing circuitry 607 may be configured to, or operable to, perform the method actions according to FIG. 2 and/or FIG. 5, in a similar manner as that described in relation to FIG. 6a. The radio circuitry 613 may be configured to set up and maintain at least a wireless connection with, e.g., the second node 112, the third node 113, the fourth node 114 and/or the group of nodes 123. Circuitry may be understood herein as a hardware component.

Hence, embodiments herein also relate to the first node 111 operative to operate in the communications network 100. The first node 111 may comprise the processing circuitry 607 and the memory 608, said memory 608 containing instructions executable by said processing circuitry 607, whereby the first node 111 is further operative to perform the actions described herein in relation to the first node 111, e.g., in FIG. 2 and/or FIG. 5.

Figure 7:
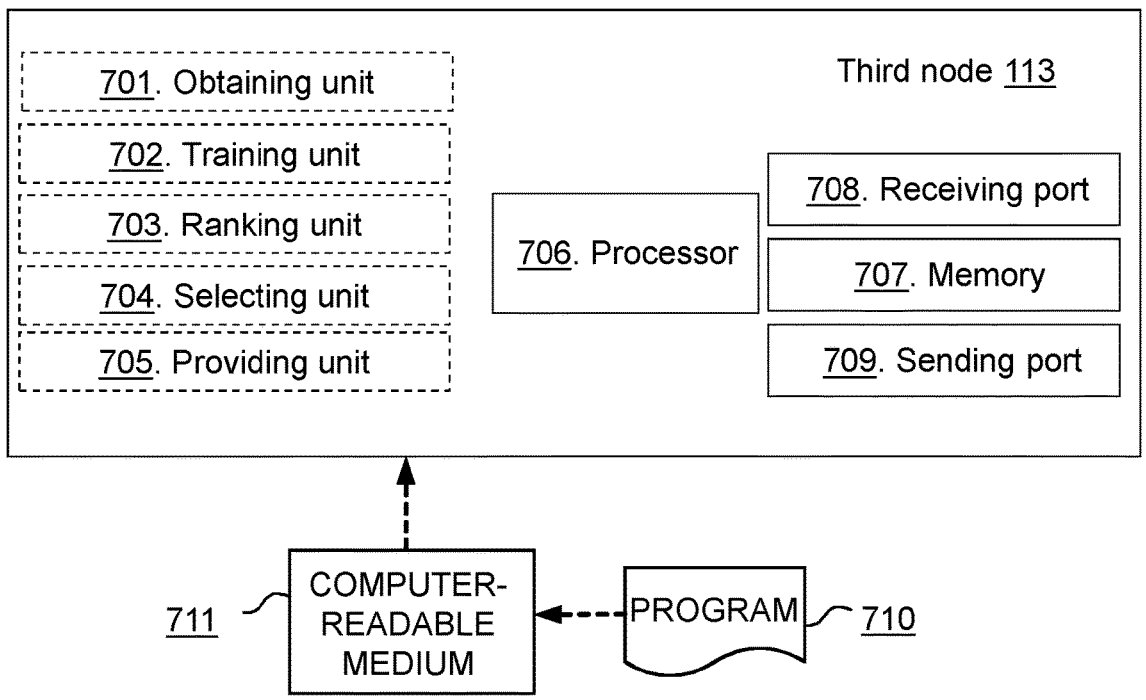
FIG. 7 is schematic block diagram illustrating two non-limiting examples, a) and b), of a third node, according to embodiments herein.
Figure 7:
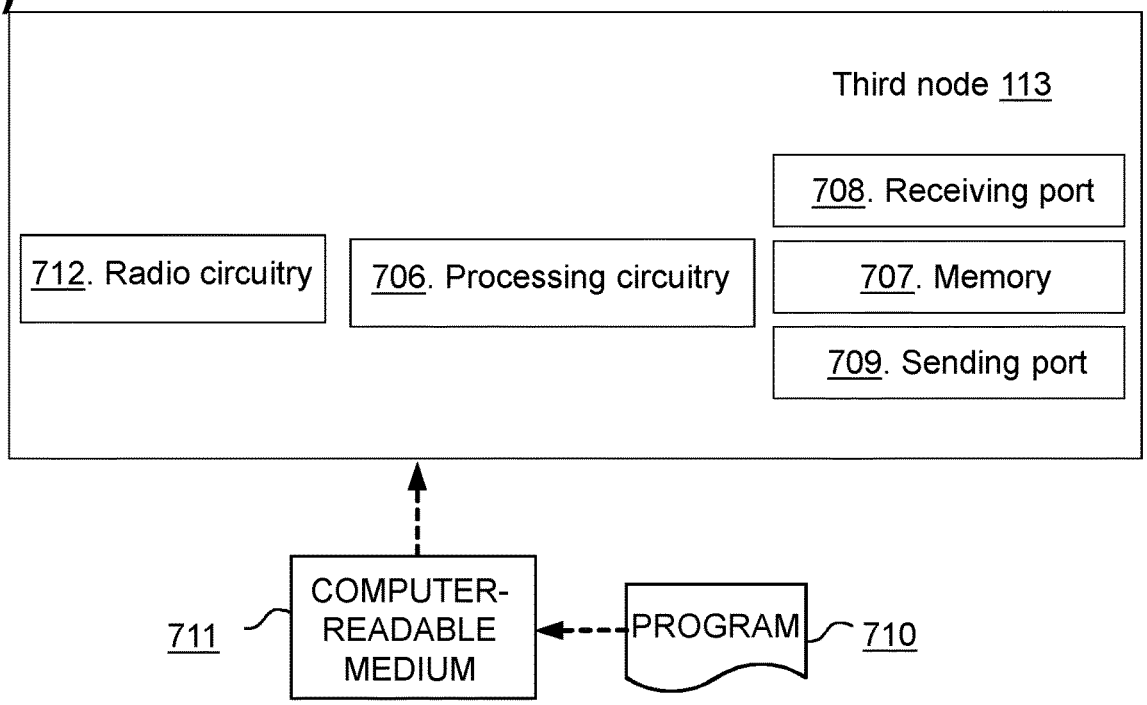

FIG. 7 depicts two different examples in panels a) and b), respectively, of the arrangement that the third node 113 may comprise to perform the method actions described above in relation to FIG. 3 and/or FIG. 5. The third node 113 is for handling the parameters to configure the second node 112. The third node 113 is configured to be an auto-encoder configured to operate in the communications network 100.

The detailed description of some of the following corresponds to the same references provided above, in relation to the actions described for the first node 111, and will thus not be repeated here. For example, the parameters may be CM parameters. In FIG. 7, optional units are indicated with dashed lines.

In some embodiments, the third node 113 may comprise the following arrangement depicted in FIG. 7a.

The third node 113 is configured to, e.g. by means of an obtaining unit 701 within the third node 113 configured to, obtain the first set of parameters configured to be observed to be linked to the performance of the first group of nodes 121 configured to operate in the communications network 100 being above the first threshold. The first set of parameters are configured to be parameters to configure the second node 112 for operation to deliver a service in the communications network 100. To obtain is configured to comprise the following. i) Training, e.g. by means of a training unit 702 within the third node 113 configured to, train the first data model with the respective data of nodes configured to be comprised in the group of nodes 123 indicative of the respective performance of the nodes over the period of time. The group of nodes 123 are configured to comprise the first group of nodes 121. ii) Obtaining, e.g. by means of the obtaining unit 701 within the first node 111 configured to, obtain the reconstruction of the respective error of the first data model configured to be trained for each of the nodes in the group of nodes 123. ii) Ranking, e.g. by means of a ranking unit 703 within the first node 111 configured to, rank the nodes configured to be comprised in the group of nodes 123 based on their respective reconstructed error. Additionally, iv) selecting, e.g. by means of a selecting unit 704 within the first node 111 configured to, select the first group of nodes 121 from the group of nodes 123 based on their respective error configured to be reconstructed being above the first threshold.

The third node 113 is further configured to, e.g. by means of a providing unit 705 within the third node 113 configured to, provide, to the first node 111 configured to operate in the communications network 100, the first indication configured to indicate the first set of parameters configured to be obtained.

In some embodiments, the first set of parameters may be configured to comprise the first plurality of sets of first one or more parameters. Each set in the first plurality of sets of first one or more parameters may be configured to correspond to a different traffic condition in the plurality of traffic conditions.

The embodiments herein may be implemented through one or more processors, such as a processor 706 in the third node 113 depicted in FIG. 7a, together with computer program code for performing the functions and actions of the embodiments herein. The processor 706 may be understood herein to be a hardware component. The program code mentioned above may also be provided as a computer program product, for instance in the form of a data carrier carrying computer program code for performing the embodiments herein when being loaded into the in the third node 113. It is however feasible with other data carriers such as a memory stick. The computer program code may furthermore be provided as pure program code on a server and downloaded to the third node 113.

The third node 113 may further comprise a memory 707 comprising one or more memory units. The memory 707 is arranged to be used to store obtained information, store data, configurations, schedulings, and applications etc. to perform the methods herein when being executed in the third node 113.

In some embodiments, the third node 113 may receive information from, e.g., the first node 111, the second node 112, the fourth node 114 and/or the group of nodes 123, through a receiving port 708. In some examples, the receiving port 708 may be, for example, connected to one or more antennas in third node 113. In other embodiments, the third node 113 may receive information from another structure in the communications network 100 through the receiving port 708. Since the receiving port 708 may be in communication with the processor 706, the receiving port 708 may then send the received information to the processor 706. The receiving port 708 may also be configured to receive other information.

The processor 706 in the third node 113 may be further configured to transmit or send information to e.g., the first node 111, the second node 112, the fourth node 114 and/or the group of nodes 123, through a sending port 709, which may be in communication with the processor 706, and the memory 707.

Any of the units 701-705 described in relation to FIG. 7 may be the processor 706 of the third node 113, or an application running on such processor.

Those skilled in the art will also appreciate that any of the units 701-705 described in relation to FIG. 7 described above may refer to a combination of analog and digital circuits, and/or one or more processors configured with software and/or firmware, e.g., stored in memory, that, when executed by the one or more processors such as the processor 706, perform as described above. One or more of these processors, as well as the other digital hardware, may be included in a single Application-Specific Integrated Circuit (ASIC), or several processors and various digital hardware may be distributed among several separate components, whether individually packaged or assembled into a System-On-a-Chip (SoC).

Thus, the methods according to the embodiments described herein for the third node 113 may be respectively implemented by means of a computer program 710 product, comprising instructions, i.e., software code portions, which, when executed on at least one processor 706, cause the at least one processor 706 to carry out the actions described herein, as performed by the third node 113. The computer program 710 product may be stored on a computer-readable storage medium 711. The computer-readable storage medium 711, having stored thereon the computer program 710, may comprise instructions which, when executed on at least one processor 706, cause the at least one processor 706 to carry out the actions described herein, as performed by the third node 113. In some embodiments, the computer-readable storage medium 711 may be a non-transitory computer-readable storage medium, such as memory stick, or stored in the cloud space. In other embodiments, the computer program 710 product may be stored on a carrier containing the computer program, wherein the carrier is one of an electronic signal, optical signal, radio signal, or the computer-readable storage medium 711, as described above.

The third node 113 may comprise an interface unit to facilitate communications between the third node 113 and other nodes or devices, e.g., the first node 111, and/or the third node 113. In some particular examples, the interface may, for example, include a transceiver configured to transmit and receive radio signals over an air interface in accordance with a suitable standard.

In other embodiments, the third node 113 may comprise the following arrangement depicted in FIG. 7b. The third node 113 may comprise a processing circuitry 706, e.g., one or more processors such as the processor 706, in the third node 113 and the memory 707. The third node 113 may also comprise a radio circuitry 712, which may comprise e.g., the receiving port 708 and the sending port 709. The processing circuitry 706 may be configured to, or operable to, perform the method actions according to FIG. 3 and/or FIG. 5, in a similar manner as that described in relation to FIG. 7a. The radio circuitry 712 may be configured to set up and maintain at least a wireless connection with, e.g., the first node 111, the second node 112, the fourth node 114 and/or the group of nodes 123. Circuitry may be understood herein as a hardware component.

Hence, embodiments herein also relate to the third node 113 operative to operate in the communications network 100. The third node 113 may comprise the processing circuitry 706 and the memory 707, said memory 707 containing instructions executable by said processing circuitry 706, whereby the third node 113 is further operative to perform the actions described herein in relation to the third node 113, e.g., in FIG. 3 and/or FIG. 5.

Figure 8:
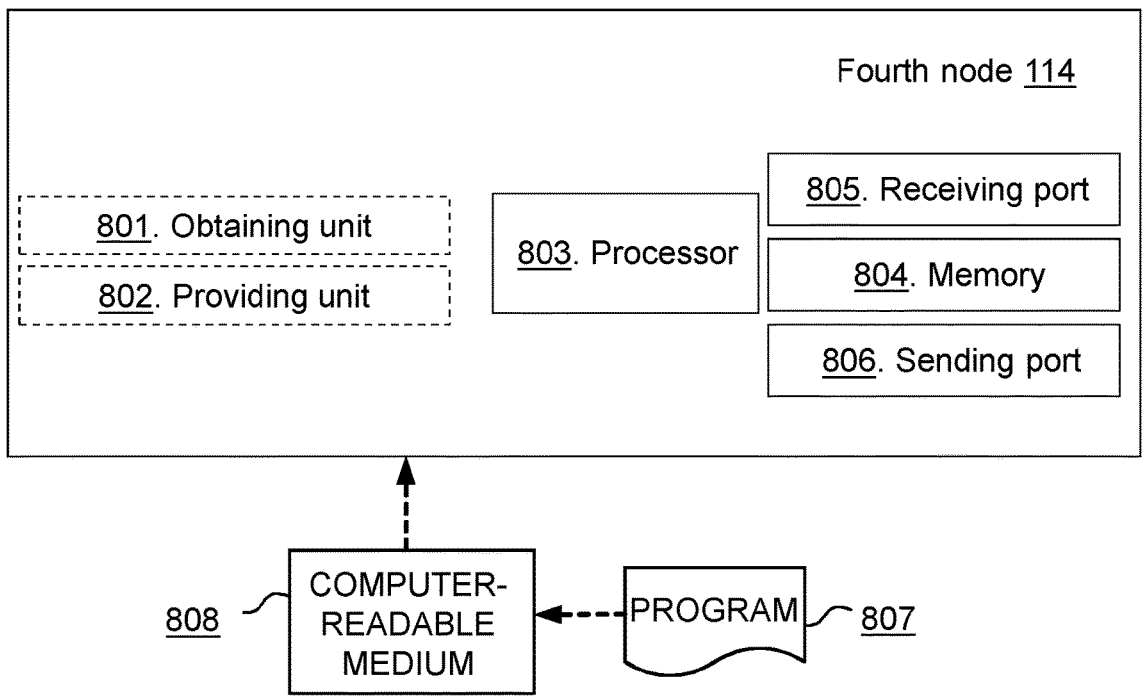
FIG. 8 is a schematic block diagram illustrating two non-limiting examples, a) and b), of a fourth node, according to embodiments herein.
Figure 8:
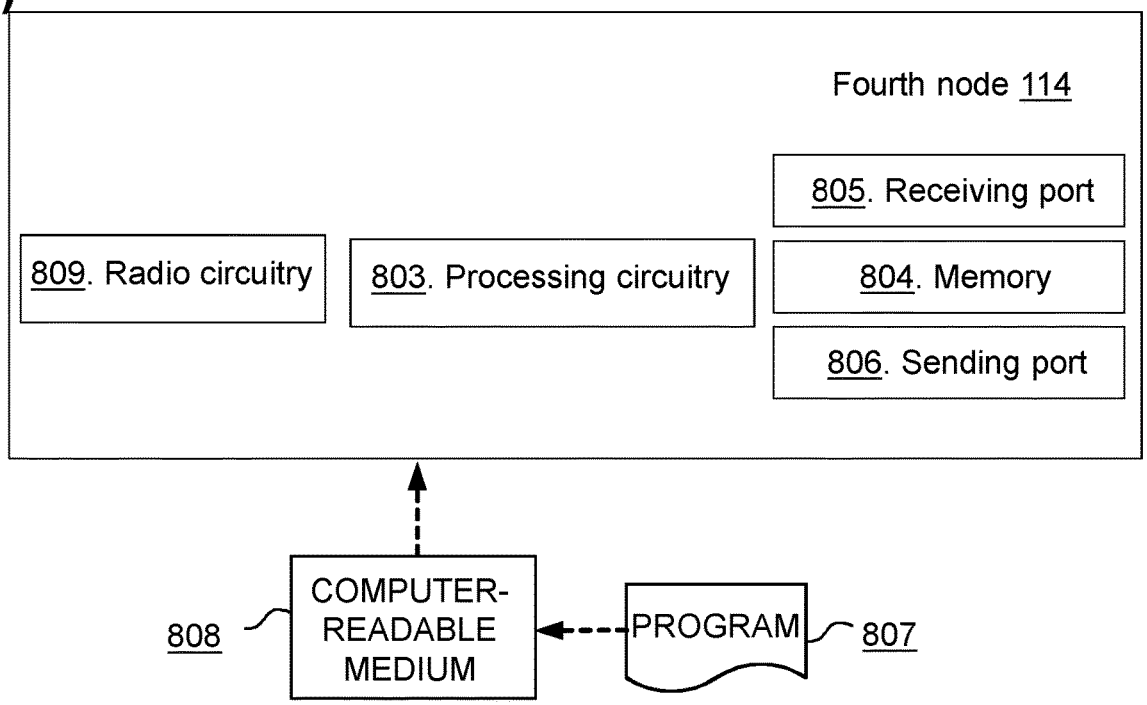

FIG. 8 depicts two different examples in panels a) and b), respectively, of the arrangement that the fourth node 114 may comprise to perform the method actions described above in relation to FIG. 4, and/or FIG. 5. The fourth node 114 is for handling parameters to configure the second node 112. The fourth node 114 is configured to operate in the communications network 100.

The detailed description of some of the following corresponds to the same references provided above, in relation to the actions described for the first node 111, and will thus not be repeated here. For example, the parameters may be CM parameters. In FIG. 8, optional units are indicated with dashed lines.

In some embodiments, the fourth node 114 may comprise the following arrangement depicted in FIG. 8a.

The fourth node 114 is configured to, e.g. by means of a receiving unit 801 within the fourth node 114 configured to, obtain the fixed length vector encoding the plurality of traffic conditions configured to be observed to be linked to the performance of the first group of nodes 121 configured to operate in the communications network 100. To obtain is configured to comprise training the second data model with the respective sequential traffic data of the nodes configured to be comprised in the first group of nodes 121 to encode the respective sequential traffic data into the fixed length vector.

The fourth node 114 is configured to, e.g. by means of a providing unit 802 within the fourth node 114 configured to, provide, to the first node 111 configured to operate in the communications network 100, the second indication indicating the fixed length vector configured to be obtained encoding the plurality of traffic conditions.

In some embodiments, the plurality of traffic conditions may vary over time. In some of such embodiments, the fourth node 114 may be configured manage an LSTM auto-encoder to obtain the fixed length vector.

The embodiments herein may be implemented through one or more processors, such as a processor 803 in the fourth node 114 depicted in FIG. 8a, together with computer program code for performing the functions and actions of the embodiments herein. The processor 803 may be understood herein to be a hardware component. The program code mentioned above may also be provided as a computer program product, for instance in the form of a data carrier carrying computer program code for performing the embodiments herein when being loaded into the in the fourth node 114. It is however feasible with other data carriers such as a memory stick. The computer program code may furthermore be provided as pure program code on a server and downloaded to the fourth node 114.

The fourth node 114 may further comprise a memory 804 comprising one or more memory units. The memory 804 is arranged to be used to store obtained information, store data, configurations, schedulings, and applications etc. to perform the methods herein when being executed in the fourth node 114.

In some embodiments, the fourth node 114 may receive information from, e.g., the first node 111, the second node 112, the third node 113 and/or the group of nodes 123, through a receiving port 805. In some examples, the receiving port 805 may be, for example, connected to one or more antennas in the fourth node 114. In other embodiments, the fourth node 114 may receive information from another structure in the communications network 100 through the receiving port 805. Since the receiving port 805 may be in communication with the processor 803, the receiving port 805 may then send the received information to the processor 803. The receiving port 805 may also be configured to receive other information.

The processor 803 in the fourth node 114 may be further configured to transmit or send information to e.g., the first node 111, the second node 112, the third node 113 and/or the group of nodes 123, through a sending port 806, which may be in communication with the processor 803, and the memory 804.

Any of the units 801-802 described in relation to FIG. 8 may be the processor 803 of the fourth node 114, or an application running on such processor.

Those skilled in the art will also appreciate that the units 801-802 described in relation to FIG. 8 described above may refer to a combination of analog and digital circuits, and/or one or more processors configured with software and/or firmware, e.g., stored in memory, that, when executed by the one or more processors such as the processor 803, perform as described above. One or more of these processors, as well as the other digital hardware, may be included in a single Application-Specific Integrated Circuit (ASIC), or several processors and various digital hardware may be distributed among several separate components, whether individually packaged or assembled into a System-on-a-Chip (SoC).

Thus, the methods according to the embodiments described herein for the fourth node 114 may be respectively implemented by means of a computer program 807 product, comprising instructions, i.e., software code portions, which, when executed on at least one processor 803, cause the at least one processor 803 to carry out the actions described herein, as performed by the fourth node 114. The computer program 807 product may be stored on a computer-readable storage medium 808. The computer-readable storage medium 808, having stored thereon the computer program 807, may comprise instructions which, when executed on at least one processor 803, cause the at least one processor 803 to carry out the actions described herein, as performed by the fourth node 114. In some embodiments, the computer-readable storage medium 808 may be a non-transitory computer-readable storage medium, such as memory stick, or stored in the cloud space. In other embodiments, the computer program 807 product may be stored on a carrier containing the computer program, wherein the carrier is one of an electronic signal, optical signal, radio signal, or the computer-readable storage medium 808, as described above.

The fourth node 114 may comprise an interface unit to facilitate communications between the fourth node 114 and other nodes or devices, e.g., the first node 111, the second node 112, the third node 113 and/or the group of nodes 123. In some particular examples, the interface may, for example, include a transceiver configured to transmit and receive radio signals over an air interface in accordance with a suitable standard.

In other embodiments, the fourth node 114 may comprise the following arrangement depicted in FIG. 8b. The fourth node 114 may comprise a processing circuitry 803, e.g., one or more processors such as the processor 803, in the fourth node 114 and the memory 804. The fourth node 114 may also comprise a radio circuitry 809, which may comprise e.g., the receiving port 805 and the sending port 806. The processing circuitry 803 may be configured to, or operable to, perform the method actions according to FIG. 4, and/or FIG. 5, in a similar manner as that described in relation to FIG. 8a. The radio circuitry 809 may be configured to set up and maintain at least a wireless connection with, e.g., the first node 111, the second node 112, the third node 113 and/or the group of nodes 123. Circuitry may be understood herein as a hardware component.

Hence, embodiments herein also relate to the third node 113 operative to operate in the communications network 100. The third node 113 may comprise the processing circuitry 803 and the memory 804, said memory 804 containing instructions executable by said processing circuitry 803, whereby the third node 113 is further operative to perform the actions described herein in relation to the third node 113, e.g., in FIG. 4, and/or FIG. 5.

When using the word "comprise" or "comprising", it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention.

As used herein, the expression "in some embodiments" has been used to indicate that the features of the embodiment described may be combined with any other embodiment or example disclosed herein.

As used herein, the expression "in some examples" has been used to indicate that the features of the example described may be combined with any other embodiment or example disclosed herein.

As used herein, the expression "at least one of:" followed by a list of alternatives separated by commas, and wherein the last alternative is preceded by the "and" term, may be understood to mean that only one of the list of alternatives may apply, more than one of the list of alternatives may apply or all of the list of alternatives may apply. This expression may be understood to be equivalent to the expression "at least one of:" followed by a list of alternatives separated by commas, and wherein the last alternative is preceded by the "or" term.

The invention claimed is:

1. A method, performed by a first node, the method being for handling parameters to configure a second node, the first node operating in a communications network, the method comprising:
    determining one or more parameters to configure the second node for operation to deliver a service in the communications network, the determining being based on an analysis performed by a conditional Generative Adversarial Network, GAN, managed by the first node, wherein performing the analysis comprises conditioning based on a plurality of traffic conditions, the analysis comprising performing iteratively:
        generating a set of parameters estimated to be linked to a performance of a first group of nodes operating in the communications network being above a first threshold, and
        discriminating between the generated set of parameters and a first set of parameters observed to be linked to the performance of the first group of nodes being above the first threshold to obtain a respective score for every parameter, wherein the respective score indicates how different the generated set of parameters and the first set of parameters are, and wherein the determined one or more parameters have the respective score resulting from the discriminating being lower than a second threshold;
    outputting an indication comprising the determined one or more parameters; and
    obtaining from a fourth node operating in the communications network, a second indication indicating a fixed length vector encoding the plurality of traffic conditions observed to be linked to the performance of the first group of nodes operating in the communications network, wherein the obtained fixed length vector is used in the generating and the discriminating in the analysis,
    wherein the determined one or more parameters comprise a plurality of sets of one or more parameters, each set in the plurality of sets of one or more parameters being determined for a different traffic condition in the plurality of traffic conditions,
    wherein the plurality of traffic conditions vary over time,
    wherein the fourth node is managed by the first node, and manages a Long Short Term Memory auto-encoder to generate the fixed length vector, and
    wherein the obtaining comprises training a second data model with respective sequential traffic data of the nodes comprised in the first group of nodes to encode the respective sequential traffic data into the fixed length vector.

2. The method of claim 1,
    the determining comprises a first phase and a second phase,
    the first phase comprises performing the generating and the discriminating by:
        i. training the GAN with the first set of parameters observed to be linked to the performance of the first group of nodes being above the first threshold and the plurality of traffic conditions to obtain a data model of the parameters based on the plurality of traffic conditions, and the second phase comprises:
  ii. executing the data model by inputting a first set of observed traffic conditions as a first fixed length vector, and
  iii. determining the one or more parameters corresponding to the first set of observed traffic conditions, based on the obtained data model.

3. The method of claim 1, further comprising:
obtaining, from a third node operating in the communications network, a first indication indicating the first set of parameters observed to be linked to the performance of the first group of nodes being above the first threshold, wherein
the obtained first set of parameters is used in the generating and the discriminating in the analysis.

4. The method of claim 3, wherein
the third node is an auto-encoder managed by the first node, and
the obtaining of the first set of parameters further comprises:
  training a first data model with respective data of nodes comprised in a group of nodes indicative of a respective performance of the nodes over a period of time, the group of nodes comprising the first group of nodes;
  obtaining a reconstruction of a respective error of the trained first data model for each of the nodes in the group of nodes;
  ranking the nodes comprised in the group of nodes based on their respective reconstructed error; and
  selecting the first group of nodes from the group of nodes based on their respective reconstructed error being above the first threshold.

5. A first node for handling parameters to configure a second node, the first node being configured to operate in a communications network, the first node being further configured to:
  determine one or more parameters to configure the second node for operation to deliver a service in the communications network, wherein to determine is configured to be based on an analysis configured to be performed by a Generative Adversarial Network, GAN, configured to be a conditional GAN and configured to be managed by the first node, wherein performing the analysis is configured to comprise conditioning based on a plurality of traffic conditions, the analysis being configured to comprise performing iteratively:
    generating a set of parameters estimated to be linked to a performance of a first group of nodes configured to operate in the communications network being above a first threshold, and
    discriminating between the set of parameters configured to be generated and a first set of parameters observed to be linked to the performance of the first group of nodes being above the first threshold to obtain a respective score for every parameter, wherein the respective score is configured to indicate how different the generated set of parameters and the first set of parameters are, and wherein the one or more parameters configured to be determined are configured to have the respective score resulting from the discriminating lower than a second threshold,
  output an indication comprising the one or more parameters configured to be determined; and
  obtain from a fourth node configured to operate in the communications network, a second indication configured to indicate a fixed length vector encoding the plurality of traffic conditions configured to be observed to be linked to the performance of the first group of nodes configured to operate in the communications network, wherein the fixed length vector configured to be obtained is configured to be used in the generating and the discriminating in the analysis,
wherein the one or more parameters configured to be determined are configured to comprise a plurality of sets of one or more parameters, each set in the plurality of sets of one or more parameters being configured to be determined for a different traffic condition in the plurality of traffic conditions,
wherein the plurality of traffic conditions vary over time,
wherein the fourth node is configured to be managed by the first node, and is configured to manage a Long Short Term Memory auto-encoder to generate the fixed length vector, and
wherein the obtaining is configured to comprise training a second data model with respective sequential traffic data of the nodes configured to be comprised in the first group of nodes to encode the respective sequential traffic data into the fixed length vector.

6. The first node of claim 5, wherein
determining said one or more parameters comprises a first phase and a second phase, the first phase comprises performing the generating and the discriminating by:
  i. training the GAN with the first set of parameters configured to be observed to be linked to the performance of the first group of nodes being above the first threshold and the plurality of traffic conditions to obtain a data model of the parameters based on the plurality of traffic conditions, and
the second phase comprises:
  ii. executing the data model by inputting a first set of observed traffic conditions as a first fixed length vector, and
  iii. determining the one or more parameters corresponding to the first set of observed traffic conditions, based on the data model configured to be obtained.

7. The first node of claim 5, further configured to:
obtain, from a third node configured to operate in the communications network, a first indication configured to indicate the first set of parameters configured to be observed to be linked to the performance of the first group of nodes being above the first threshold, wherein
the first set of parameters configured to be obtained is configured to be used in the generating and the discriminating in the analysis.

8. The first node of claim 7, wherein the third node is an auto-encoder configured to be managed by the first node, and wherein the obtaining of the first set of parameters is further configured to comprise:
  training a first data model with respective data of nodes configured to be comprised in a group of nodes indicative of a respective performance of the nodes over a period of time, the group of nodes configured to comprise the first group of nodes;
  obtaining a reconstruction of a respective error of the first data model configured to be trained for each of the nodes in the group of nodes;
  ranking the nodes configured to be comprised in the group of nodes based on their respective reconstructed error;

selecting the first group of nodes from the group of nodes based on their respective error configured to be reconstructed being above the first threshold.

* * * * *